(12) United States Patent
Fodor et al.

(10) Patent No.: US 8,718,634 B2
(45) Date of Patent: May 6, 2014

(54) METHOD AND ARRANGEMENT IN A COMMUNICATION SYSTEM

(75) Inventors: Gabor Fodor, Hässelby (SE); Muhammad Kazmi, Bromma (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 273 days.

(21) Appl. No.: 13/128,231

(22) PCT Filed: Nov. 7, 2008

(86) PCT No.: PCT/SE2008/051271
§ 371 (c)(1),
(2), (4) Date: May 6, 2011

(87) PCT Pub. No.: WO2010/053415
PCT Pub. Date: May 14, 2010

(65) Prior Publication Data
US 2011/0217989 A1   Sep. 8, 2011

(51) Int. Cl.
*H04W 88/02* (2009.01)
(52) U.S. Cl.
USPC ................................................. 455/420
(58) Field of Classification Search
USPC ................................................. 455/420
See application file for complete search history.

(56) References Cited

U.S. PATENT DOCUMENTS 7,231,216 B2 * 6/2007 Tafazolli et al. ............ 455/456.1
7,751,827 B2 * 7/2010 Poykko et al. .............. 455/456.1
8,364,164 B2 * 1/2013 Phatak et al. ............... 455/456.1
2007/0026870 A1   2/2007 Spain et al.

FOREIGN PATENT DOCUMENTS

| CN | 1678126 A | 10/2005 |
| CN | 1722897 A | 1/2006 |
| EP | 1018850 A | 7/2000 |
| EP | 1148754 A | 10/2001 |
| WO | WO 02/47419 A | 6/2002 |
| WO | WO2004/023155 A | 3/2004 |
| WO | WO 2008/021979 A | 2/2008 |

OTHER PUBLICATIONS

International Preliminary Report on Patentability, PCT Application No. PCT/SE2008/051271, Feb. 7, 2011 (16 pages).

(Continued)

*Primary Examiner* — Diane Mizrahi
(74) *Attorney, Agent, or Firm* — Myers Bigel Sibley & Sajovec, PA

(57) ABSTRACT

A first user terminal and method of operating the first user terminal so as to provide location information associated with the first user terminal to a second user terminal are disclosed. The first user terminal and the second user terminal are comprised within a wireless communication system, which wireless communication system further comprises a plurality of radio base stations of which a first one of the plurality of radio base stations is serving the first user terminal. A signal is received from one of the radio base stations comprising the absolute geographical coordinates corresponding to the location of that radio base station. Pilot signal measurements are performed on the received signal. The absolute geographical coordinates corresponding to the location of the first user terminal are determined based on the performed pilot signal measurements and the received absolute geographical coordinates of the radio base station. The determined absolute geographical coordinates are transmitted to the second user terminal.

20 Claims, 12 Drawing Sheets

(56) References Cited

OTHER PUBLICATIONS

International Search Report, PCT Application No. PCT/SE2008/051271, Sep. 21, 2009 (27 pages).
Second and Supplementary Notice Informing the Applicant of the Communication of the International Application, PCT Application No. PCT/SE2008/051271, Mar. 10, 2011 (1 page).
Drane C. et al., "Positioning GSM Telephones," IEEE Communications Magazine, IEEE Service Center, Piscataway, US, vol. 36, No. 4, Apr. 1, 1998, pp. 46-54, 58.
Chinese First Office Action Corresponding to Chinese Patent Application No. 200880131900.2; Date of Issue: May 22, 2013; 18 Pages.

* cited by examiner

METHOD AND ARRANGEMENT IN A COMMUNICATION SYSTEM

CROSS-REFERENCE TO RELATED APPLICATION

This application is a 35 U.S.C. §371 national stage application of PCT International Application No. PCT/SE2008/051271, filed on 7 Nov. 2008, the disclosure of which is incorporated by reference herein in its entirety. The above-referenced PCT International Application was published in the English language as International Publication No. WO 2010/053415 A1 on 14 May 2010.

TECHNICAL FIELD

The present invention relates to a method and an arrangement in a first user terminal, a method and an arrangement in a first radio base station, a method and an arrangement in a second user terminal and a method and an arrangement in a second radio base station. In particular it relates to a mechanism for providing navigation assistance within the wireless communication system.

BACKGROUND

Two or more users may want to meet on a specific geographical position at a specific time instant, such as e.g. at the current location of one of the users. It may however be difficult for the users to determine and locate the specific geographical position where the meeting is to take place e.g. the current location of another user. Also, it may be a problem to determine the own geographical position, in order to navigate towards the agreed specific geographical position.

A known possibility to determine the geographical position of a user equipment is to use satellite based positioning methods. Due to their high accuracy of tracking the position of a user equipment, satellite based positioning methods, such as those based on the Global Positioning System, GPS or on the European Galileo system, are gaining popularity. However, due to invisibility of satellites in closed areas, this method can typically only be employed in open or quasi-open area environments. Also, a GPS or any other satellite based method is specified as a user equipment capability. This means that low-end terminals are not likely to offer satellite based positioning services. Thirdly, the GPS based method was introduced in later releases in widely used wireless communication standards, such as the 3GPP UTRAN. Similarly, the early release of 3GPP Long Term Evolution (LTE) does not contain the GPS positioning method. Thus, legacy terminals or terminals compliant to early standards releases cannot be expected to support GPS based services.

The standards for existing and future generation cellular communication systems provide support for location based and positioning services. Traditionally, these services are based on determining the geographical position of user equipments relative to base stations (node Bs) in the coverage area of a Radio Access Network (RAN) and/or a Public Land Mobile Network (PLMN).

Determining the geographical position can be based on path loss measurements and reporting that allow the serving base station to calculate the geometry of the served user equipments. Once the geometry is established, Node Bs can estimate the geographical position by, for instance, using pre-established data bases that associate geometry values with geographical positions/spatial coordinates. The pre-established data bases may have been obtained during measurement campaigns.

A well known specific example is that of the so called location fingerprinting positioning method. It is based on the creation of a radio fingerprint based on path loss or signal strength measurements for each point of a fine coordinate grid that covers the Radio Access Network. The fingerprint may e.g. consist of the cell identities (cell IDs) that are detected by the terminal, in each grid point and/or quantized path loss or signal strength measurements, with respect to multiple radio base stations, performed by the terminal, in each grid point.

According to the known location fingerprinting positioning method, a radio fingerprint is first measured, after which the corresponding grid point is looked up and reported, whenever a position request arrives.

Determining the position of the user equipment can also be based on measuring the time difference of arrival of some known signals, such as pilot symbols, from serving cell and any one of the neighbour. The user equipment may perform this measurement with respect to several neighbour cells, typically three or four cells, to collect reliable statistics for determining its position. One specific example is the observed time difference of arrival between the received primary CPICH from the serving cell and the neighbour cell. This measurement is used in WCDMA. It is more specifically termed as the observed System Frame Number (SFN)-SFN time difference type 2. In such systems, the user equipment can track its positions by measuring SFN-SFN time difference type 2. The accuracy of this measurement is two times better than other similar timing measurements in WCDMA e.g. SFN-SFN type 1, which is measured on broadcast channels from serving cell and neighbour cells. Another difference is that SFN-SFN type 2 does not require the user equipment to synchronize to the broadcast channel of the neighbour cells. On the other hand the user equipment is synchronized to the pilot symbols, e.g. primary CPICH in WCDMA of the N strongest neighbour cells for performing measurements. Due to these reasons SFN-SFN type 2 or similar measurements, based on pilot symbols, are more suited for determining the user equipments position.

It is thus a need for a service that can provide assistance to users who try to find the way to another user, or to any other determined meeting place. In this document, such service will be referred to as a rendezvous service.

In order to achieve such rendezvous service to assist the involved users, the position of the own user equipment and/or the other user equipments are determined.

For example, user equipment A provides his GPS coordinates to user equipment B who in turn uses a "GPS map" to calculate a route and navigate from his current position to user equipment A's position.

However, this type of service assumes that user equipment A can determine its own GPS coordinates and communicate them to user equipment B. If user equipment A does not have a GPS equipment, the rendezvous service is difficult to provide, since the geometry based positioning is less precise and more difficult to provide to user equipment "B" who may not have the same coordinate system. User equipment B can e.g. be served by another PLMN than user equipment A.

Thus it is a problem to provide a high precision ("GPS like") rendezvous service for user equipments that do not have a GPS receiver and/or that cannot determine position by satellites due to invisibility of satellites in closed areas.

Generally, the problems associated with providing a high precision rendezvous service are to obtain the GPS coordinates of a user equipment without a GPS receiver/out of satellite range and/or to be able to navigate to a certain location with a user equipment without a GPS receiver and a GPS map.

Further, the problem as formulated above is not addressed by existing standards and state of the art solutions. On the one hand, traditional cellular devices such as e.g. GSM do not aim at providing GPS based navigation and positioning services. Rather, these devices generally provide positioning services based on relative coordinates typically valid within a public land mobile network (PLMN), i.e. relative to the position of cellular base stations or sites. On the other hand, positioning and location based services making use of the GPS coordinates are provided for devices with GPS receiver fulfilling, for instance, the relevant 3GPP specifications.

Shortly put, the problem with state of the art solutions is that they do not provide a solution to the problem described in the preceding paragraphs.

An example of such a situation is when a first user, who may be equipped with a GPS receiver and a GPS map, wishes to meet a second user at the current location of the second user with a legacy user terminal, without any GPS support. For instance, the first user would like its terminal screen to display the location of the second user. This not only requires the acquisition of the current location or geographical coordinates of the first user but also its permission for security/integrity reasons.

That is, generally speaking, the problem is to provide rendezvous service to users some or all of which not having a GPS device.

SUMMARY

It is therefore an object of the present invention to provide an improved performance in a wireless communication system.

According to a first aspect, the object is achieved by a method in a first user terminal for providing location information associated with the first user terminal to a second user terminal. The first user terminal and the second user terminal are comprised within a wireless communication system. The wireless communication system further comprises a plurality of radio base stations. One first radio base station of the plurality of radio base stations is at the moment serving the first user terminal. The method comprises the step of receiving a signal from one of the radio base stations. The received signal comprises the absolute geographical coordinates corresponding to the location of that radio base station. The method further comprises to perform pilot signal measurements on the received signal. Also, the method comprises determining the absolute geographical coordinates corresponding to the location of the first user terminal. The determination is based on the performed pilot signal measurements and the received absolute geographical coordinates of the radio base station. Further, the method comprises transmitting the determined absolute geographical coordinates to the second user terminal.

According to a second aspect, the object is also achieved by an arrangement in a first user terminal for providing location information associated with the first user terminal, to a second user terminal. The first user terminal and the second user terminal are comprised within a wireless communication system. The wireless communication system further comprises a plurality of radio base stations. One first radio base station of the plurality of radio base stations is at the moment serving the first user terminal. The arrangement comprises a receiving unit. The receiving unit is adapted to receive a signal from one of the radio base stations. The received signal comprises the absolute geographical coordinates corresponding to the location of that radio base station. The arrangement also comprises a measurement unit, The measurement unit is adapted to perform pilot signal measurements on the received signal. Further, the arrangement comprises a determination unit. The determination unit is adapted to determine the absolute geographical coordinates corresponding to the location of the first user terminal. The determination is based on the performed pilot signal measurements and the received absolute geographical coordinates of the radio base station. Also, the arrangement comprises a transmitting unit. The transmitting unit is adapted to transmit the determined absolute geographical coordinates to the second user terminal.

According to a third aspect, the object is achieved by a method in a first radio base station, for serving a first user terminal in providing location information associated with the first user terminal, to a second user terminal. The first radio base station, the first user terminal and the second user terminal are comprised within a wireless communication system. The wireless communication system further comprises a plurality of radio base stations. One second radio base station out of the plurality of radio base stations is at the moment serving the second user terminal. The method comprises the step of obtaining the absolute geographical coordinates corresponding to the location of at least some radio base station. Further, the method comprises the step of obtaining the absolute geographical coordinates corresponding to the location of at least some radio base station. Also, the method comprises the step of receiving pilot signal measurements from the first user terminal. The pilot signal measurements are made on a signal broadcasted from at least some radio base station. In addition, the method comprises the step of receiving pilot signal measurements from the first user terminal. The pilot signal measurements are made on a signal broadcasted from at least some radio base station. Still further, the method comprises the step of computing the relative coordinates of the first user terminal. The relative coordinates comprises cell ID and geometry values, based on the received pilot signal measurements made on a signal broadcasted from each respective radio base station. Further yet, the method comprises the step of sending the computed coordinates of the first user terminal to at least one entity out of: first user terminal, the second user terminal and/or the second radio base station.

According to a fourth aspect, the object is also achieved by an arrangement in a first radio base station, for serving a first user terminal in providing location information associated with the first user terminal, to a second user terminal. The first radio base station, the first user terminal and the second user terminal are comprised within a wireless communication system. The wireless communication system further comprises a plurality of radio base stations. One second radio base station out of the plurality of radio base stations is at the moment serving the second user terminal. The arrangement comprises an obtaining unit. The obtaining unit is adapted to obtain the absolute geographical coordinates corresponding to the location of at least some radio base station. Further, the arrangement comprises a receiving unit. The receiving unit is adapted to receive pilot signal measurements from the first user terminal. The pilot signal measurements are made on a signal broadcasted from at least some radio base station. Also, the arrangement comprises a computing unit. The computing unit is adapted to compute the relative coordinates of the first user terminal. The relative coordinates comprises cell ID and geometry values, based on the received pilot signal measurements made on a signal broadcasted from at least some radio base station. Also, the arrangement comprises a sending unit.

The sending unit is adapted to send the computed coordinates of the first user terminal to at least one entity out of: first user terminal, the second user terminal and/or the second radio base station.

According to a fifth aspect, the object is achieved by a method in a second user terminal, for receiving location information associated with a first user terminal. The first user terminal and the second user terminal are comprised within a wireless communication system. The wireless communication system further comprises a plurality of radio base stations. One second radio base station out of the plurality of radio base stations is at the moment serving the second user terminal. The method comprises the step of receiving location information, comprising the absolute geographical coordinates of the first user terminal. The method also comprises the step of sending the received absolute geographical coordinates of the first user terminal, to the second radio base station. The absolute geographical coordinates of the first user terminal are sent in a request for converting them into relative coordinates comprising a cell ID and geometry values. Further, the method comprises the step of receiving the coordinates of the first user terminal, converted into relative coordinates comprising cell ID and geometry values, from the second radio base station.

According to a sixth aspect, the object is also achieved by an arrangement in a second user terminal, for receiving location information associated with a first user terminal. The first user terminal and the second user terminal are comprised within a wireless communication system. The wireless communication system further comprises a plurality of radio base stations. One second radio base station out of the plurality of radio base stations is at the moment serving the second user terminal. The arrangement comprises a receiving unit. The receiving unit is adapted to receive location information, comprising the absolute geographical coordinates of the first user terminal. Also, the arrangement comprises a sending unit. The sending unit is adapted to send the received absolute geographical coordinates of the first user terminal to the second radio base station, in a request for converting them into relative coordinates comprising a cell ID and geometry values. The receiving unit is further adapted to receive the coordinates of the first user terminal, converted into relative coordinates comprising cell ID and geometry values, from the second radio base station.

According to a seventh aspect, the object is achieved by a method in a second radio base station, for serving a second user terminal in receiving location information associated with a first user terminal. The second radio base station, the first user terminal and the second user terminal are comprised within a wireless communication system. The wireless communication system further comprises a plurality of radio base stations of which one first radio base station at the moment is serving the first user terminal. The method comprises the step of receiving the absolute geographical coordinates of the first user terminal. Also, the method comprises the step of converting the received absolute geographical coordinates into relative coordinates comprising cell ID and geometry values by using a mapping table. Further, the method comprises the step of sending the converted coordinates of the first user terminal, converted into relative coordinates comprising cell ID and geometry values, to the second user terminal.

According to a eighth aspect, the object is achieved by a method in a second radio base station for serving a second user terminal in receiving location information associated with a first user terminal. The second radio base station, the first user terminal and the second user terminal are comprised within a wireless communication system. The wireless communication system further comprises a plurality of radio base stations of which one first radio base station at the moment is serving the first user terminal. The arrangement comprises a receiving unit. The receiving unit is adapted to receive the absolute geographical coordinates of the first user terminal. Also, the arrangement further comprises a converting unit. The converting unit is adapted to convert the received absolute geographical coordinates into relative coordinates comprising cell ID and geometry values by using a mapping table. Further yet, the arrangement comprises a sending unit, adapted to the converted coordinates of the first user terminal, converted into relative coordinates comprising cell ID and geometry values, to the second user terminal.

Thanks to the present methods and arrangements, it is possible to determine the position of a first user terminal, communicate the position of the user terminal to a second user terminal and guide the second user terminal to the first user terminal, e.g. by displaying the positions of the two user terminals on the second user terminal and optionally also on the first user terminal, independently if the first or second user terminals comprises GPS arrangements or not. Thus a method and arrangement of providing a rendezvous service is provided. Thereby, an improved wireless communication system is provided as a consequence of the present improved mechanism for providing navigation assistance within the wireless communication system.

An advantage of the present methods and arrangements is that user equipments with various and different capabilities can participate in a rendezvous service. A further advantage of the present invention is that user equipments using different radio access technologies and employing different location determination technologies and residing in separate wireless networks (e.g. different public land mobile networks) can participate in a rendezvous service.

Other objects, advantages and novel features of the invention will become apparent from the following detailed description of the invention.

BRIEF DESCRIPTION OF THE DRAWINGS

The present invention will now be described more in detail in relation to the enclosed drawings, in which.

DETAILED DESCRIPTION

The invention is defined as a method and an arrangement in a first user terminal, a method and an arrangement in a first radio base station, a method and an arrangement in a second user terminal and a method and an arrangement in a second radio base station, which may be put into practice in the embodiments described below. This invention may, however, be embodied in many different forms and should not be construed as limited to the embodiments set forth herein; rather, these embodiments are provided so that this disclosure will be thorough and complete, and will fully convey the scope of the invention to those skilled in the art. It should be understood that there is no intent to limit the present methods and/or arrangements to any of the particular forms disclosed, but on the contrary, the present methods and arrangements are to cover all modifications, equivalents, and alternatives falling within the scope of the invention as defined by the claims.

Figure 1:
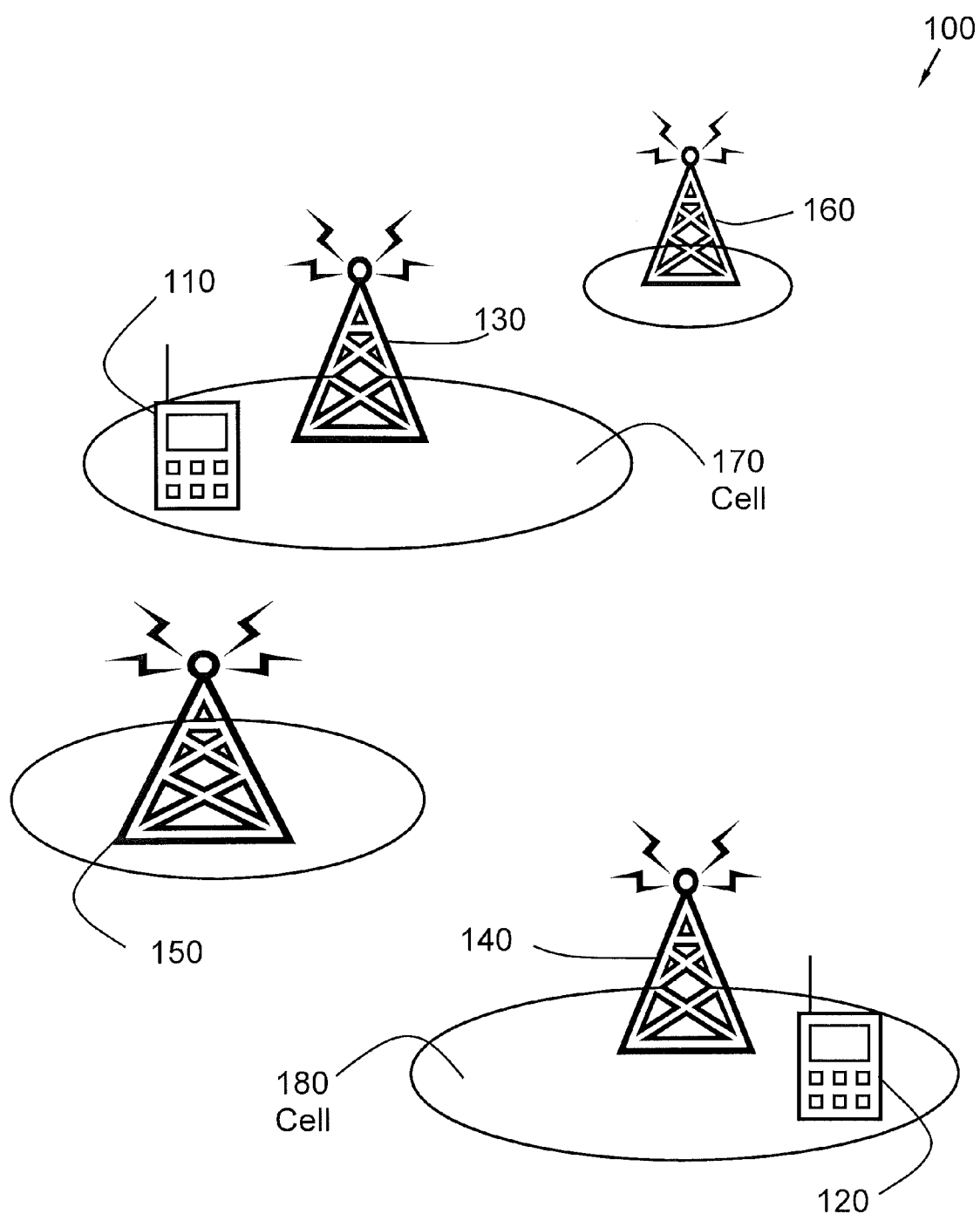
FIG. 1 is a schematic block diagram illustrating a wireless communication system.

FIG. 1 depicts a wireless communication system 100 comprising a first user terminal 110 and a second user terminal 120. The first user terminal 110 and the second user terminal 120 are adapted to communicate with each other wirelessly. The communication between the user terminal 110 and the second user terminal 120 may be made via a first radio base station 130, which first radio base station 130 is serving the first user terminal 110 within a cell 170, and a second radio base station 140, serving the second user terminal 120 within a second cell 180.

The wireless communication system 100 may further comprise a plurality of radio base stations 130, 140, 150, 160, which all are configured to receive and transmit wireless signals.

The radio base stations 130, 140, 150, 160 may in some embodiments be referred to as an access point, a Node B, an evolved Node B (eNodeB) and/or a base transceiver station, Access Point Base Station, base station router, etc depending e.g. of the radio access technology and terminology used.

The number of components illustrated in FIG. 1 is purely exemplary. Other configurations with more, fewer, or a different arrangement of components may be implemented. Moreover, in some embodiments, one or more components in FIG. 1 may perform one or more of the tasks described as being performed by one or more other component in FIG. 1.

In some embodiments, the first user terminal 110 and the second user terminal 120 may be represented by e.g. a wireless communication terminal, a mobile cellular telephone, a Personal Communications Systems terminal, a Personal Digital Assistant (PDA), a laptop, a computer, user equipment (UE) or any other kind of device capable of managing radio resources. A Personal Communication System terminal may combine a cellular radiotelephone with data processing, facsimile and data communications capabilities. A PDA may include a radiotelephone, a pager, an Internet/intranet access device, a web browser, an organizer, calendars etc.

However, in the non limiting example depicted in FIG. 1, the first user terminal 110 and second user terminal 120 are represented by mobile cellular telephones.

The wireless communication system 100 may be based on technologies such as e.g. E-UTRAN, LTE, Code division multiple access (CDMA), Wideband Code Division Multiple Access (WCDMA), CDMA 2000, High Speed Downlink Packet Data Access (HSDPA), High Speed Uplink Packet Data Access (HSUPA), High Data Rate (HDR), TD-SCDMA, Wimax, etc.

The basic concept of the present method comprises to determine the location of the second user terminal 120, from the first user terminal 110, wherein none, or only one of the first user terminal 110 and second user terminal 120 is equipped with GPS.

The motivation for exchanging current positions between the first user terminal 110 and second user terminal 120 is that it may allow a convenient way of rendezvousing by allowing a user e.g. the first user terminal 110, to invite another party, e.g. the second user terminal 120, by calling that party or sending a message using the Short Message Service (SMS) or other similar application level protocol to rendezvous. If the invited second user terminal 120 agrees, it can e.g. send an SMS comprising its GPS coordinates and a permission to display its position on the calling first user terminal 110's screen. This allows displaying each other's positions quasi real time e.g. on a map while allowing the users to discuss rendezvous details, exchange instructions, etc.

This type of service can be implemented in many ways. For example, the first user terminal 110 can request the second user terminal 120 to provide its location e.g. by entering its number when prompted by for example pressing a special key managed by an application, or similar. In response, the second user terminal 120 may either accept or reject the request. In the former scenario the return message is accompanied by its coordinates, which are translated into GPS by the network and eventually provided to the first user terminal 110.

The method will now be described in two scenarios, wherein it is assumed that the first user terminal 110 is not equipped with GPS while the second user terminal 120 is equipped with GPS.

Scenario 1: Suppose that the second user terminal 120 wishes to find the location of the first user terminal 110 for the purpose of rendezvousing with the first user terminal 110 at its location. In this case, the first user terminal 110 needs to determine its own absolute geographical coordinates and communicate it to the second user terminal 120.

Scenario 2: Suppose that the first user terminal 110 wishes to find the location of the second user terminal 120 for the purpose of rendezvousing with the second user terminal 120 at its location. In this case, the second user terminal 120 sends its own absolute geographical coordinates to the first user terminal 110. The first user terminal 110 needs to be able to navigate to the location of the second user terminal 120.

However, it is to be noted that the present solution may be applied independently if any of the first user terminal 110 or the second user terminal 120 are equipped with GPS or not. The two scenarios which here will be further explained are only to be seen as non limiting examples only. Scenario 2 will be further discussed in connection with FIG. 3. However, firstly the scenario 1 will be discussed.

In the first scenario, the first user terminal 110 can use one of the following two methods to find out its own absolute geographical coordinates. Each radio base station 130, 140, 150, 160 broadcasts its own absolute geographical coordinates. The geographical coordinates may be broadcasted with a low periodicity. Alternatively, each radio base station 130, 140, 150, 160 broadcasts absolute geographical coordinates of its own and in addition all nearest neighbours.

According to some embodiments, the first user terminal 110 may decode the absolute geographical coordinates of a number of radio base stations 130, 140, 150, 160. According to some embodiments, the absolute geographical coordinates of three radio base stations 130, 140, 150, 160 are determined. However, it may be an advantage if the absolute geographical coordinates of more radio base stations 130, 140, 150, 160, e.g. four radio base stations 130, 140, 150, 160 may be determined. The determined absolute geographical coordinates of a number of radio base stations 130, 140, 150, 160 may then be reported, along with the usual geometry and/or time difference measurements, to its serving radio base station 130.

According to yet some alternative embodiments, the first user terminal 110 may maintain a table comprising the absolute geographical coordinates of the radio base stations 130, 140, 150, 160 within range. This may be performed by letting the radio base stations 130, 140, 150, 160 broadcasts the own absolute geographical coordinates, possibly at a low periodicity.

The first user terminal 110 may use the state-of-the art "triangle method" and e.g. three path loss/signal strength measurement values from surrounding radio base stations 130, 140, 150, 160 to determine its own distance from the surrounding radio base stations 130, 140, 150, 160 and thereby its own relative coordinates, i.e. its position relative to its serving first radio base station 130. Using these distance values, its relative position and the broadcasted absolute geographical values, the first user terminal 110 may then determine its own absolute geographical coordinates. The first user terminal 110 may then either directly send the obtained absolute geographical coordinates using, for instance, application level protocols to the second user terminal 120, that is transparently to the system 100, or through network assistance.

According to some other embodiments, the serving radio base station 130 may determine the geometry of the first user terminal 110 and send it to the first user terminal 110. Based on its own measured geometry, received from the serving radio base station 130, the first user terminal 110 calculates its absolute geographical coordinates. The first user terminal 110 can do this e.g. by using a mapping table. In the mapping table, the geometry values and absolute geographical coordinates that it downloads from the system 100 upon the attach procedure. Alternatively, the first user terminal 110 may store this kind of mapping table on its SIM card or upon another memory device comprised within, or associated with the first user terminal 110.

However, according to some embodiments, the serving first radio base station 130 maintains a mapping table, wherein the absolute geographical coordinates are associated with the geometry values of the first user terminal 110.

The creation and refinement of such a mapping table may be possible with state of the art methods such as fingerprinting, which may require measurement campaigns and extensive surveying to establish geometry/signal strength/path loss etc to a physical location. Instead it may be assumed that the first user terminal 110 reports the measured path loss/signal strength values to the radio base station 130, 140, 150, 160. Based on these measurement reports and using the mapping table, the serving first radio base station 130 may send the absolute geographical coordinates to the first user terminal 110. Alternatively, the serving first radio base station 130 may send, on the first user terminal 110's behalf, the first user terminal 110's absolute geographical coordinates to the second user terminal 120, as further explained in connection with FIG. 2.

However, firstly it will be discussed some examples of how pilot signal measurements may be performed in order to determine geometry values and/or the relative position of the first user terminal 110, in relation to some radio base station 130, 140, 150, 160 within range.

Pilot signal measurements may be performed by the first user terminal 110 on signals received from radio base stations 130, 140, 150, 160 within range.

The pilot signal measurement may, according to some embodiments, comprise one or more measurement out of: pilot signal strength, pilot signal quality, round trip time of a signal sent between the first user terminal 110 and to the radio base station 130, 140, 150, 160, time difference of arrival between pilot signals sent between the serving first radio base station 130 and neighbour radio base stations 130, 140, 150, 160.

However, also other measurements may be made in order to determine geometry values and/or the relative position of the first user terminal 110. For example, quantized path loss or signal strength measurements, with respect to multiple radio base stations 130, 140, 150, 160, may be performed by the first user terminal 110. It is to be noted that it may be expedient to collect an associated ID of the respective radio base station 130, 140, 150, 160. Timing Advance (TA) may be used e.g. within a system 100 based on GSM. Also when using timing advance measurements for positioning, an associated ID of the respective radio base station 130, 140, 150, 160 may also be expedient. Another option may be to use the quantized noise rise as a measurement. The quantized noise rise represents the load of a wireless communication system 100, such as e.g. a CDMA based system.

The time of arrival may be a measurement of arrival times of uplink bursts from the user terminal 110, 120 to some radio base stations 130, 140, 150, 160 within the infrastructure 100, e.g. three or more radio base stations 130, 140, 150, 160.

The round trip time is the time difference between the beginning of signal transmission in the downlink and the estimated first path of the corresponding signal received in the uplink. The round trip time may be measured at the radio base station 130, 140, 150, 160. The round trip time measurement is a user specific measurement; this means it is measured separately for each user terminal 110, 120 in the cell 170, 180.

According to some embodiments, wherein the communication system 100 is an UTRAN system, the round trip time may be specified as an UTRAN measurement. Round Trip Time (RU) may be defined as follows:

$$RTT = TRX - TTX,$$

Where TTX is the time of transmission of the beginning of a downlink Dedicated PHY Channel (DPCH) frame to the first user terminal 110. TRX is the time of reception of the beginning, for the first detected path, in time of the corresponding uplink Dedicated PHY Control Channel (DPCCH) frame from the first user terminal 110.

However, according to some embodiments, wherein the communication system 100 is represented by E-UTRAN, the round trip time may also be measured at the radio base station 130, 140, 150, 160 or "eNodeB" in E-UTRAN terminology.

In E-UTRAN like in UTRAN the round trip time may also be the time difference between the received signal at the radio base station 130, 140, 150, 160 and the transmitted signal at the radio base station 130, 140, 150, 160 that triggers the corresponding uplink transmission. However the round trip time measurement as done in E-UTRAN may differ compared to UTRAN since different radio access technologies are used in UTRAN and E-UTRA. UTRAN and E-UTRAN are based on CDMA and OFDMA technologies respectively. In addition the control channels and their structure may also differ in the two systems. This may lead to different measurement methods in the two systems. But regardless of the round trip time measurement mechanism and principles, its meaning is the same in E-UTRAN as in UTRAN in the sense that it enables the system 100 to find the complete round trip time.

When the radio base station 130, 140, 150, 160 receives the signal in response to the previously sent signal the round trip time may be calculated at the radio base station 130, 140, 150, 160.

In order to being able to calculate the round trip time, or the distance between the radio base station 130, 140, 150, 160 and the user terminal 110, 120, attention may be paid to the fact that the downlink and uplink may not be aligned in the user terminal 110, 120. For this reason the time between reception of the downlink frame in the user terminal 110, 120 and the transmission of the uplink frame from the user terminal 110, 120 may have to be subtracted from the round trip time measurement. After this, the distance between the radio base station 130, 140, 150, 160 and the user terminal 110 may be estimated by performing a division by 2 and a multiplication by the speed of light.

Figure 2:
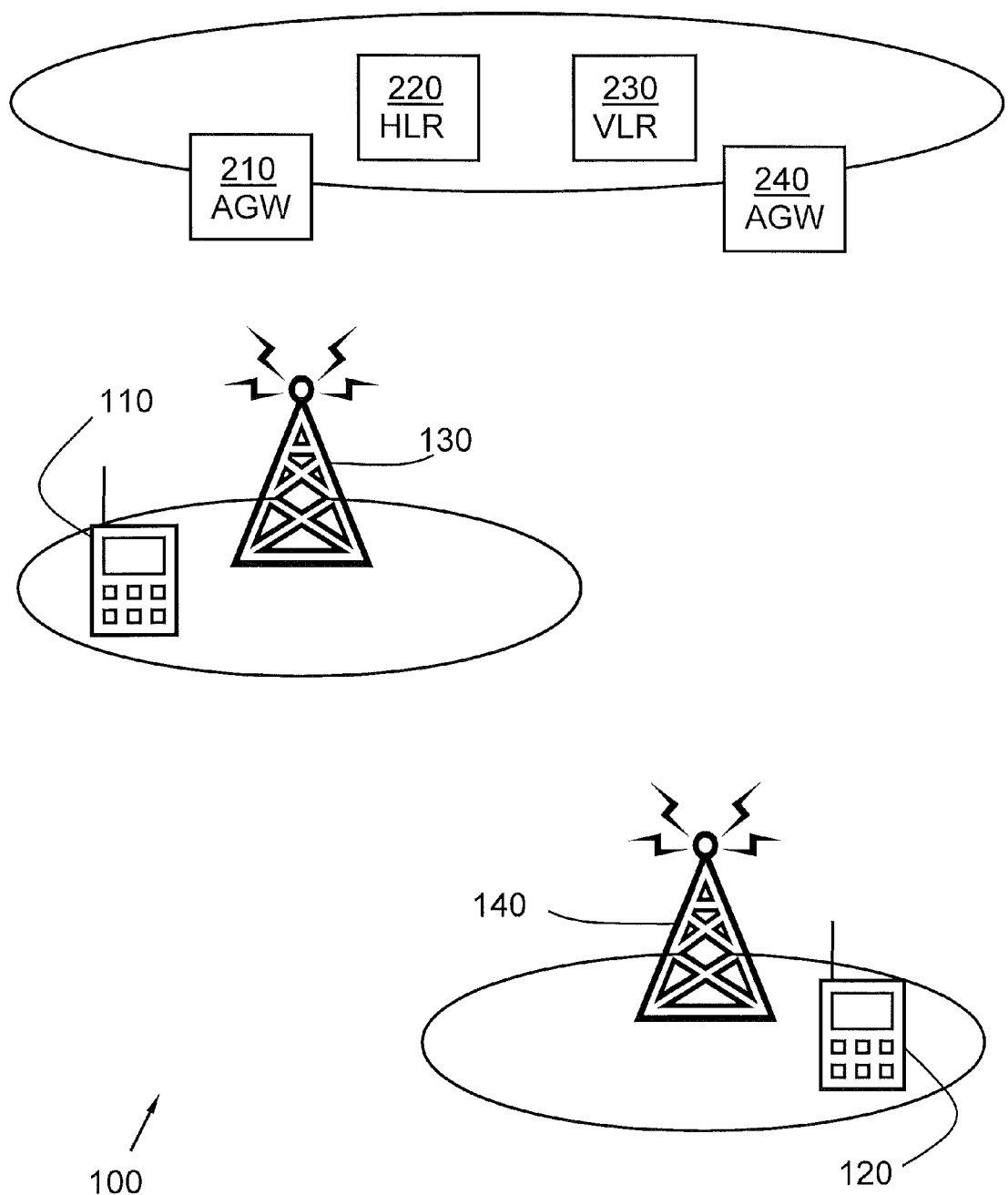
FIG. 2 is a block diagram illustrating an embodiment of a wireless communication system.

FIG. 2 is a block diagram illustrating an embodiment of a wireless communication system 100. The absolute geographical coordinates of the first user terminal 110 may thus according to some embodiments be sent to the second user terminal 120 from the first radio base station 130.

According to some embodiments, the first user terminal 110 may send a connection establishment request with the second user terminal 120 to its serving Access Gateway AGW 210 via its serving first radio base station 130. The Access Gateway 210 plays a similar role as a mobile switching center.

The serving Access Gateway 210 may consult the Home Location Register HLR 220 to find out the serving Access Gateway 210's address of the second user terminal 120.

The serving Access Gateway 210 of the first user terminal 110 sends the message to the serving Access Gateway 240. The Access Gateway 240 consult the Visiting Location Register VLR 230 to find out the second user terminal 120's temporary identity (TMSI) that it can use for paging.

The Access Gateway 240 pages the second user terminal 120 in the connected cells.

The second user terminal 120 responds to the paging. The Access Gateway 240 now knows the cell identifier of the second user terminal 120.

Figure 3:
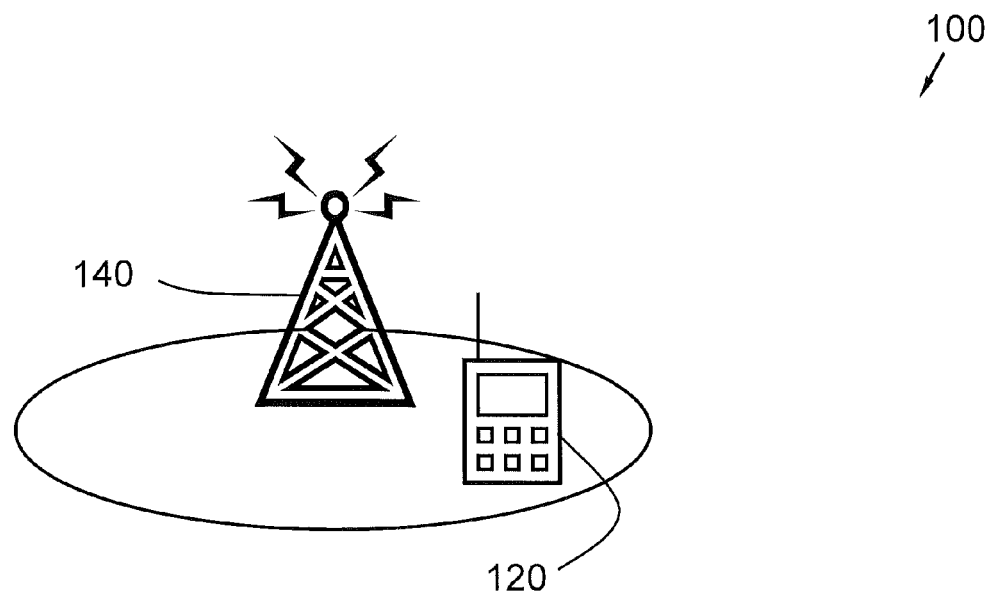
FIG. 3 is a block diagram illustrating an embodiment of a wireless communication system and in particular an embodiment of a user terminal.
Figure 3:
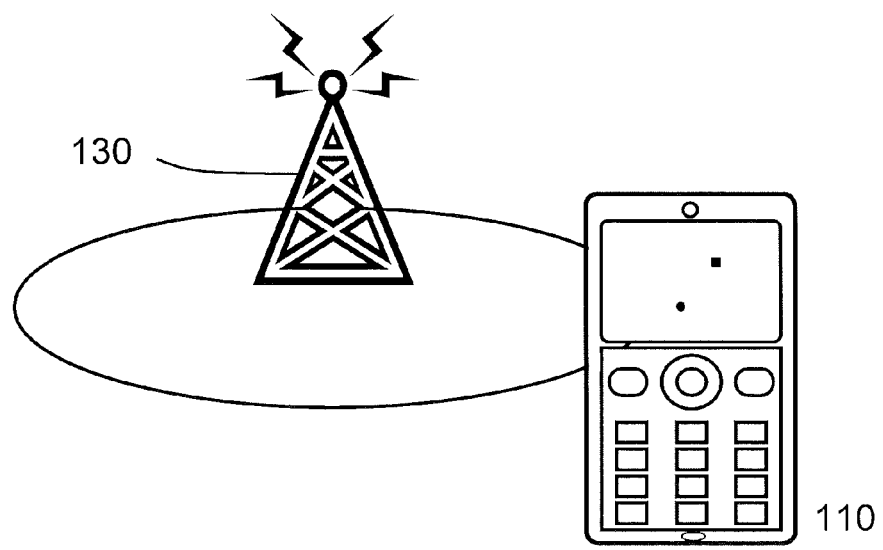

FIG. 3 is a block diagram illustrating an embodiment of a wireless communication system 100, according to a second scenario.

In the second scenario, the second user terminal 120 sends its own absolute geographical coordinates to the first user terminal 110. Alternatively, the serving radio base station 140 of the second user terminal 120 may send the absolute geographical coordinates of the second user terminal 120 to the first user terminal 110. The first user terminal 110 reports the absolute geographical coordinates of the second user terminal 120 to its serving radio base station 140. The serving second radio base station 140 may translate the absolute geographical coordinates to a Cell ID and a geometry value and/or a set of path loss values that can be measured between the second user terminal 120 and its surrounding radio base stations 130, 140, 150, 160 and sends these relative coordinates to the second user terminal 120. The first user terminal 110 first finds the actual, serving cell 180 of the second user terminal 120. Once the first user terminal 110 is in the serving cell 180 of the second user terminal 120, it uses path loss measurements and their changes, as the first user terminal 110 proceeds toward the second user terminal 120, to determine the direction into which it needs to move in order to find the second user terminal 120, within the cell 180.

According to some embodiments, the position of the first user terminal 110 and the second user terminal 120 may be displayed on the display of the first user terminal 110. Thus, the geographical position of the first user terminal 110 and the second user terminal 120 may be presented to the user of the first user terminal 110.

Figure 4:
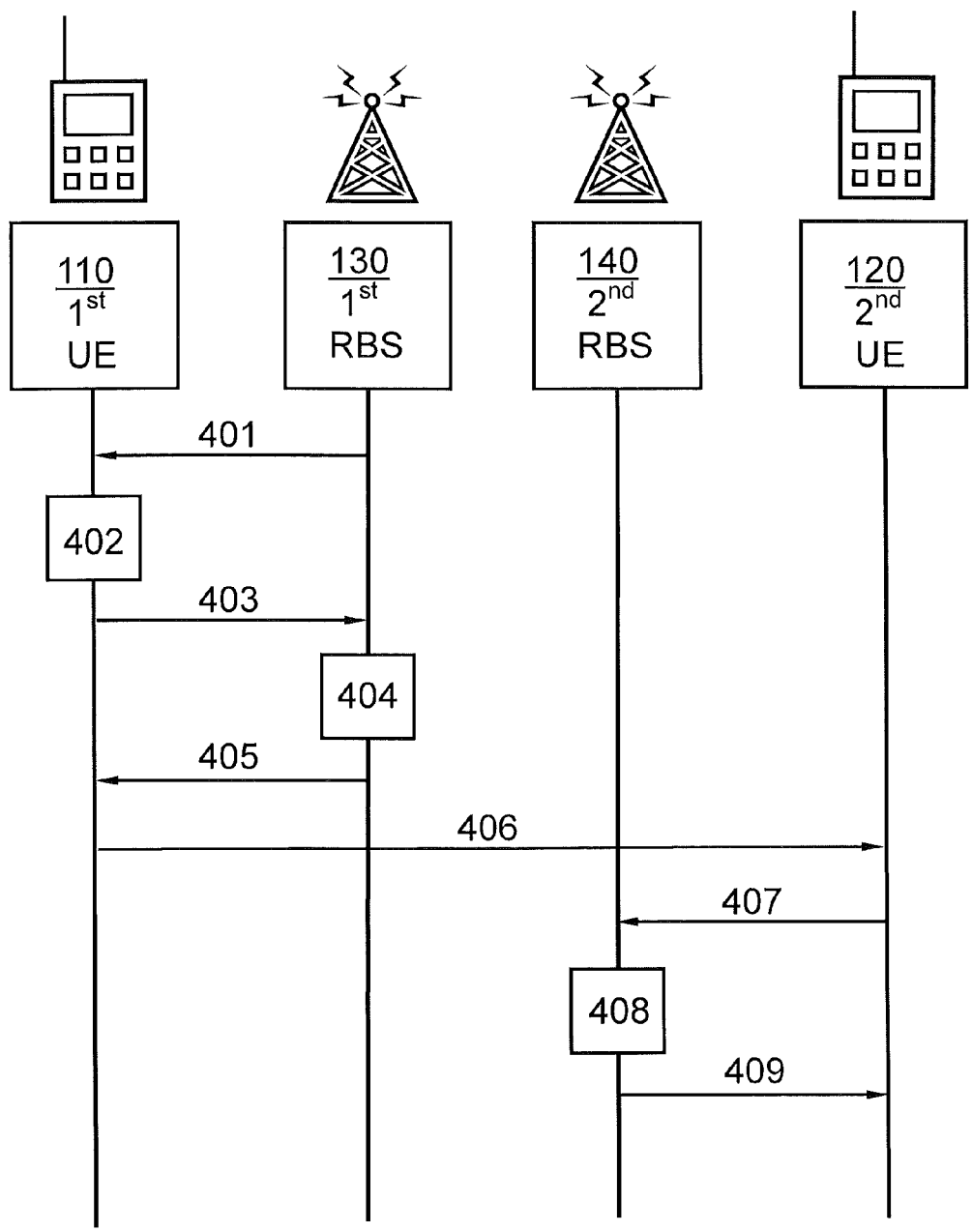
FIG. 4 is a combined flow chart and signalling scheme illustrating an embodiment of the present solution.

FIG. 4 is a combined flow chart and signalling scheme illustrating an embodiment of the present solution.

According to the illustrated embodiment, the absolute geographical coordinates of the first user terminal 110 is acquired, sent to the second user terminal 120 and presented to the user of the second user terminal 120. The method steps here discussed is however only illustrating one out of a plurality of possible embodiments.

401:
first radio base station 130, which is the serving radio base station of the first user terminal 110, may broadcast the own absolute geographical coordinates, to be received by the first user terminal 110. The first radio base station 130 may broadcast the absolute geographical coordinates of the first radio base station 130, with low periodicity.

According to yet some embodiments, the first radio base station 130 may broadcast not only the own absolute geographical coordinates but also the absolute geographical coordinates of neighbouring radio base stations 140, 150, 160.

It is however to be noticed that step 401 is optional and may according to some embodiments not be performed at all, in particular in embodiments wherein the computation of the absolute geographical coordinates of the first user terminal 110 is performed within the serving first radio base station 130 and the first radio base station 130 has been supplied with the absolute geographical coordinates of neighbouring radio base stations 130, 140, 150, 160.

402:
The first user terminal 110 acquires the absolute geographical coordinates of the first radio base station 130 and also other radio base stations 130, 140, 150, 160 within range. also this step is optional and may not be performed in case the computation of the absolute geographical coordinates of the first user terminal 110 is performed within the serving first radio base station 130.

403:
The first user terminal 110 may according to some embodiments report pilot measurements to the serving first radio base station 130. The pilot measurements may comprise e.g. path loss and/or signal strength measurement.

The first user terminal 110 may according to some embodiments send also the received absolute geographical coordinates of other radio base stations 140, 150, 160 within range to the serving first radio base station 130. However, this is only performed in embodiments wherein the serving first radio base station 130 is not acquainted with the absolute geographical coordinates of other radio base stations 140, 150, 160.

404:
The serving first radio base station 130 may use the reported pilot measurements to determine the relative position such as e.g. cell ID and geometry of the first user terminal 110.

The serving first radio base station 130 may according to some embodiments map the calculated relative coordinates of the first user terminal 110, comprising cell ID and geometry values to absolute geographical coordinates.

405:
The serving first radio base station 130 may according to some embodiments send the calculated absolute geographical coordinates of the first user terminal 110 to the first user terminal 110.

406:
The first user terminal 110 may send the calculated absolute geographical coordinates of the first user terminal 110 to the second user terminal 120. According to some embodiments, the calculated absolute geographical coordinates of the first user terminal 110 may be sent to the second user terminal 120 in an SMS or other convenient application level protocol.

407:

The second user terminal 120 receives the absolute geographical coordinates of the first user terminal 110. According to some embodiments, the absolute geographical coordinates of the first user terminal 110 may be received by the second user terminal 120 in an SMS.

The absolute geographical coordinates of the first user terminal 110 may be further sent to the second radio base station 140, which is the serving radio base station of the second user terminal 120.

408:

The second radio base station 140 may according to some embodiments translate the received absolute geographical coordinates of the first user terminal 110 into relative coordinates comprising cell ID and geometry.

409:

The second user terminal 120 may then receive the relative coordinates comprising cell ID and geometry of the first user terminal 110.

The user of the second user terminal 120 may then, supplied with the cell ID and geometry of the first user terminal 110, navigate to the position of the first user terminal 110. According to some embodiments, the user of the second user terminal 120 may firstly navigate to the same cell as the first user terminal 110 at the moment is situated in. once in the same cell as the first user terminal 110, the geometry values, path loss measurements and their changes to determine the direction into which it needs to move in order to find the first user terminal 110.

Figure 5:
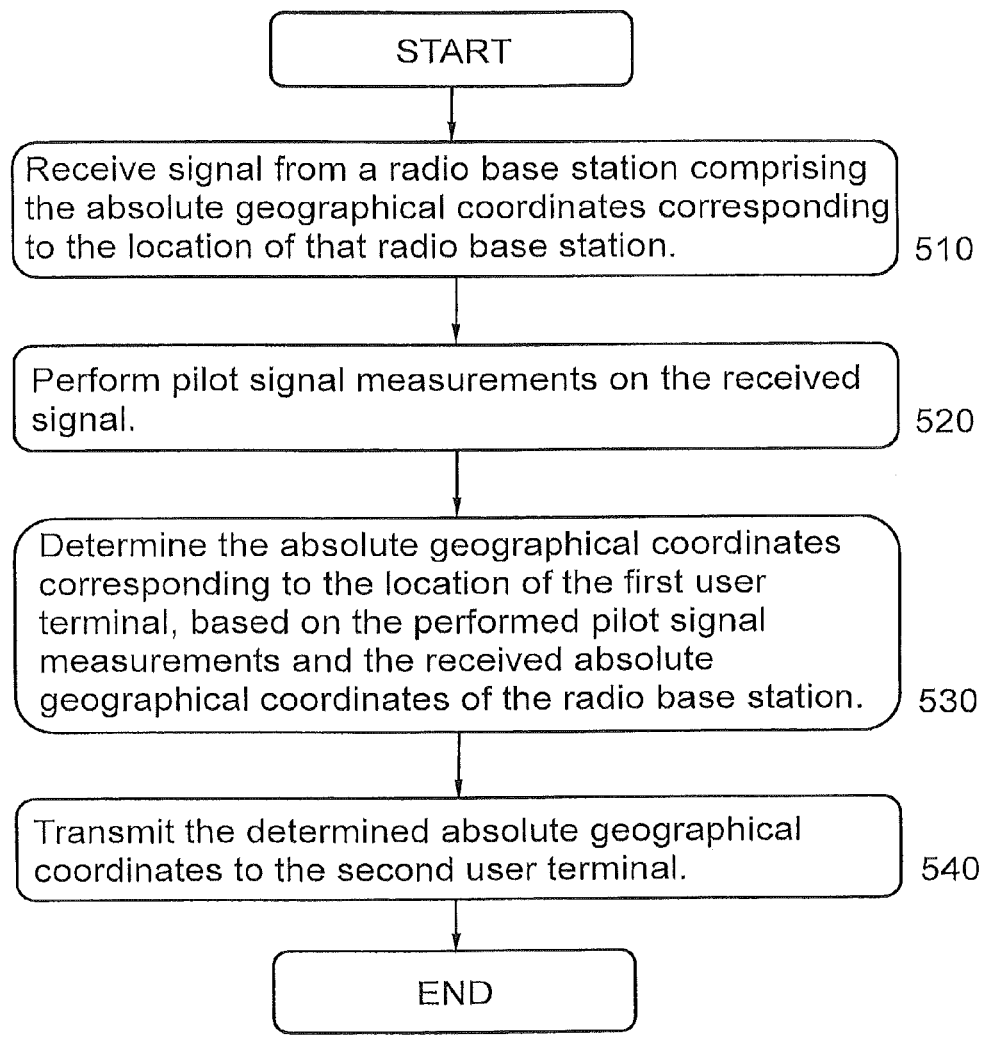
FIG. 5 is a flow chart illustrating embodiments of method steps in a first user terminal.

FIG. 5 is a flow chart illustrating embodiments of method steps 510-540 performed in a first user terminal 110. The method aims at providing location information associated with the first user terminal 110, to a second user terminal 120. The first user terminal 110 and the second user terminal 120 are comprised within a wireless communication system 100.

The wireless communication system 100 further comprises a plurality of radio base stations 130, 140, 150, 160. One of the plurality of radio base stations 130, 140, 150, 160 is the first radio base station 130 at the moment is serving the first user terminal 110.

To appropriately provide location information associated with the first user terminal 110 to the second user terminal 120, the method may comprise a number of method steps 510-540. However, it is to be noted that some parts of the described method steps are optional and only comprised within some embodiments. The method may comprise the following steps:

Step 510

A signal is received from one of the radio base stations 130, 140, 150, 160. The signal comprises the absolute geographical coordinates corresponding to the location of that radio base station 130, 140, 150, 160.

According to some optional embodiments, the received signal from the radio base station 130, 140, 150, 160 may comprise the absolute geographical coordinates corresponding to the location of the radio base station 130, 140, 150, 160, in addition further comprises the absolute geographical coordinates corresponding to the location of at least some other radio base station 130, 140, 150, 160.

The absolute geographical coordinates may be based on a Global Navigational Satellite System (GNSS) assisted method. The GNSS may in turn be based on a Global Positioning System (GPS), according to some embodiments.

GNSS is a standard generic term for satellite navigation systems that enable subscribers to locate their position and acquire other relevant navigational information.

GPS and the European Galileo positioning system are some examples of GNSS. Other potential systems, which may be used are: Russian GLObal NAvigation Satellite System (GLONASS), Chinese COMPASS and Indian Regional Navigational Satellite System (IRNSS).

The GPS comprises of a constellation of 24 to 32 Medium Earth Orbit (MEO) satellites revolving around the earth. They transmit pilot signals and other broadcast information, which are received and processed by GPS receivers for determining geographical position. Signals from certain number of satellites, e.g. five or more, may be received in order for the GPS receiver to accurately location the geographical position of the user. An increased number of visible satellites may further enhance the accuracy.

The assisted GPS (A-GPS) is tailored to work with the user terminal 110, 120 and thus enables subscribers to relatively accurately determine the location of the user terminal 110, 120. Also time and even velocity including direction in open area environment provided a sufficient number of satellites are visible.

Step 520

Pilot signal measurements are performed on the received signal.

The pilot signal measurement may, according to some embodiments, comprise one or more measurement out of: pilot signal strength, pilot signal quality, round trip time of a signal sent between the first user terminal 110 and to the radio base station 130, 140, 150, 160, time difference of arrival between pilot signals sent between the serving first radio base station 130 and neighbour radio base stations 130, 140, 150, 160.

Step 530

The absolute geographical coordinates corresponding to the location of the first user terminal 110 is determined. The determination may be based on the performed pilot signal measurements and the received absolute geographical coordinates of the radio base station 130, 140, 150, 160.

According to some optional embodiments, the determination of the absolute geographical coordinates corresponding to the location of the first user terminal 110 may comprise to firstly determine the relative coordinates of the first user terminal 110, which relative coordinates comprises cell ID and geometry values, and thereafter converting the determined relative coordinates of the first user terminal 110 into absolute geographical coordinates by using a mapping table.

According to some optional embodiments, the determination of the absolute geographical coordinates corresponding to the location of the first user terminal 110 may further comprise to report the performed pilot signal measurements and/or the received absolute geographical coordinates of at least some radio base stations 130, 140, 150, 160, to the first radio base station 130, and to receive the absolute geographical coordinates of the first user terminal 110 from the first radio base station 130, where said coordinates have been computed based on the reported pilot signal measurements and the absolute geographical coordinates of at least some radio base stations 130, 140, 150, 160.

According to some optional embodiments, the determination of the absolute geographical coordinates corresponding to the location of the first user terminal 110 may further comprise to report the performed pilot signal measurements and/or the received absolute geographical coordinates of at least some radio base stations 130, 140, 150, 160, to the first radio base station 130, to receive the relative coordinates of the first user terminal 110, which relative coordinates comprises cell ID and geometry values, from the first radio base station 130, where said coordinates have been computed based on the reported pilot signal measurements, and to convert the received relative coordinates of the first user terminal 110 into absolute geographical coordinates by using a mapping table.

The relative geographical coordinates may be based on GNSS, such as e.g. GPS.

Step 540

The determined absolute geographical coordinates is transmitted to the second user terminal 120.

Figure 6:
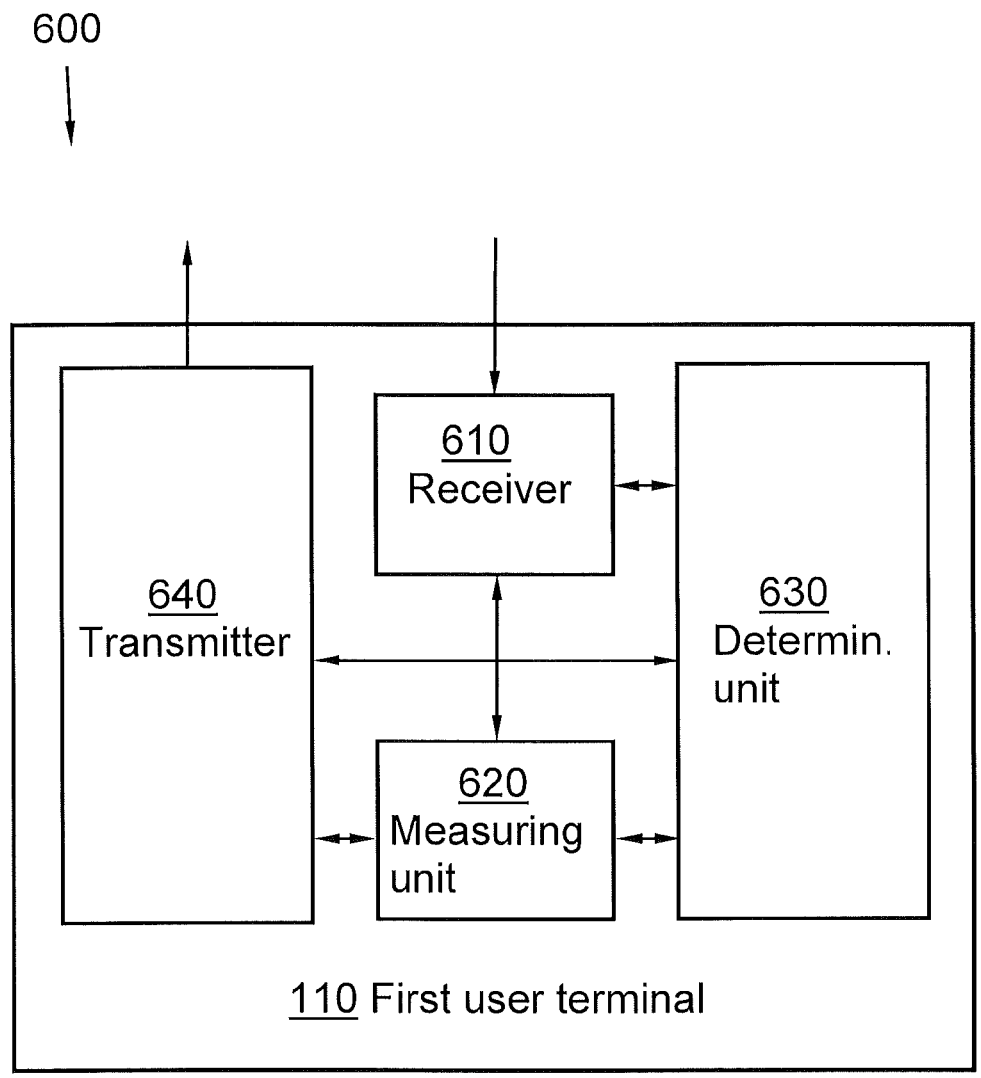
FIG. 6 is a block diagram illustrating embodiments of an arrangement in a first user terminal.

FIG. 6 is a block diagram illustrating embodiments of an arrangement 600 situated in the first user terminal 110. The arrangement 600 is configured to provide location information associated with the first user terminal 110 to a second user terminal 120. The first user terminal 110 and the second user terminal 120 are comprised within a wireless communication system 100. The wireless communication system 100 further comprises a plurality of radio base stations 130, 140, 150, 160. One first radio base station 130 of the plurality of radio base stations 130, 140, 150, 160 is at the moment serving the first user terminal 110. The arrangement 600 comprises a receiving unit 610. The receiving unit 610 is adapted to receive a signal from one of the radio base stations 130, 140, 150, 160. The signal comprises the absolute geographical coordinates corresponding to the location of that radio base station 130, 140, 150, 160.

The arrangement 600 comprises a measurement unit 620. The measurement unit 620 is adapted to perform pilot signal measurements on the received signal. Further, the arrangement 600 comprises a determination unit 630. The determination unit 630 is adapted to determine the absolute geographical coordinates corresponding to the location of the first user terminal 110, based on the performed pilot signal measurements and the received absolute geographical coordinates of the radio base station 130, 140, 150, 160. Also, the arrangement 600 comprises a transmitting unit 640. The transmitting unit 640 is adapted to transmit the determined absolute geographical coordinates to the second user terminal 120.

For the sake of clarity, at least some internal electronics of the arrangement 600, not completely necessary for performing the present method has been omitted from FIG. 6.

It is to be noted that the described units 610-640 comprised within the arrangement 600 are to be regarded as separate logical entities but not with necessity separate physical entities. Any, some or all of the units 610-640 may be comprised or co-arranged within the same physical unit. However, in order to facilitate the understanding of the functionality of the arrangement 600, the comprised units 610-640 are illustrated as separate physical units in FIG. 6.

Thus the receiving unit 610 and e.g. the sending unit 640 may, according to some embodiments, be comprised within one physical unit, a transceiver, which may comprise a transmitter circuit and a receiver circuit, which respectively transmits outgoing radio frequency signals to the first radio base station 130 and receives incoming radio frequency signals from the first radio base station 130 via an antenna. The antenna may be an embedded antenna, a retractable antenna or any antenna known to those having skill in the art without departing from the scope of the present invention.

According to some optional embodiments, the arrangement 600 comprises further units such as e.g. a transceiver, a processing unit, a memory, an input device, an output device, and a bus.

The optional processing unit may comprise a Central Processing Unit (CPU), a processor, a microprocessor, or processing logic that may interpret and execute instructions. The processing unit may perform all data processing functions for inputting, outputting, and processing of data including data buffering and device control functions, such as call processing control, user interface control, or the like.

The optional memory may provide permanent, semi-permanent, or temporary working storage of data and instructions for use by processing unit in performing device processing functions. The memory may comprise e.g. ROM, RAM, large-capacity storage devices, such as a magnetic and/or optical recording medium and its corresponding drive, and/or other types of memory devices.

The optional input device may comprise mechanisms for entry of data into the user terminal 110. As a non limiting example only, the input device may comprise a key pad. The key pad may permit manual user entry of data into the user terminal 110.

The optional output device may comprise mechanisms for outputting data in audio, video and/or hard copy format. For example, the output device may comprise a speaker that comprises mechanisms for converting electrical signals into auditory output. The output device may further comprise a display unit that displays output data to the user. For example, the display unit may provide a graphical user interface that displays output data to the user. The display unit may comprise a screen display that may provide a user interface, e.g., a graphical user interface that may be used by a user for selecting device functions. The screen display of the display unit may comprise any type of visual display, such as, for example, a Liquid Crystal Display (LCD), a plasma screen display, a Light-Emitting Diode (LED) display, a Cathode Ray Tube (CRT) display, an Organic Light-Emitting Diode (OLED) display, etc.

The optional bus may interconnect the various components of the user terminal 110 to permit the components to communicate with one another.

The configuration of components of the first user terminal 110 illustrated in FIG. 6 is for illustrative purposes only. Other configurations comprising more, fewer, or a different arrangement of components may be implemented.

Figure 7:
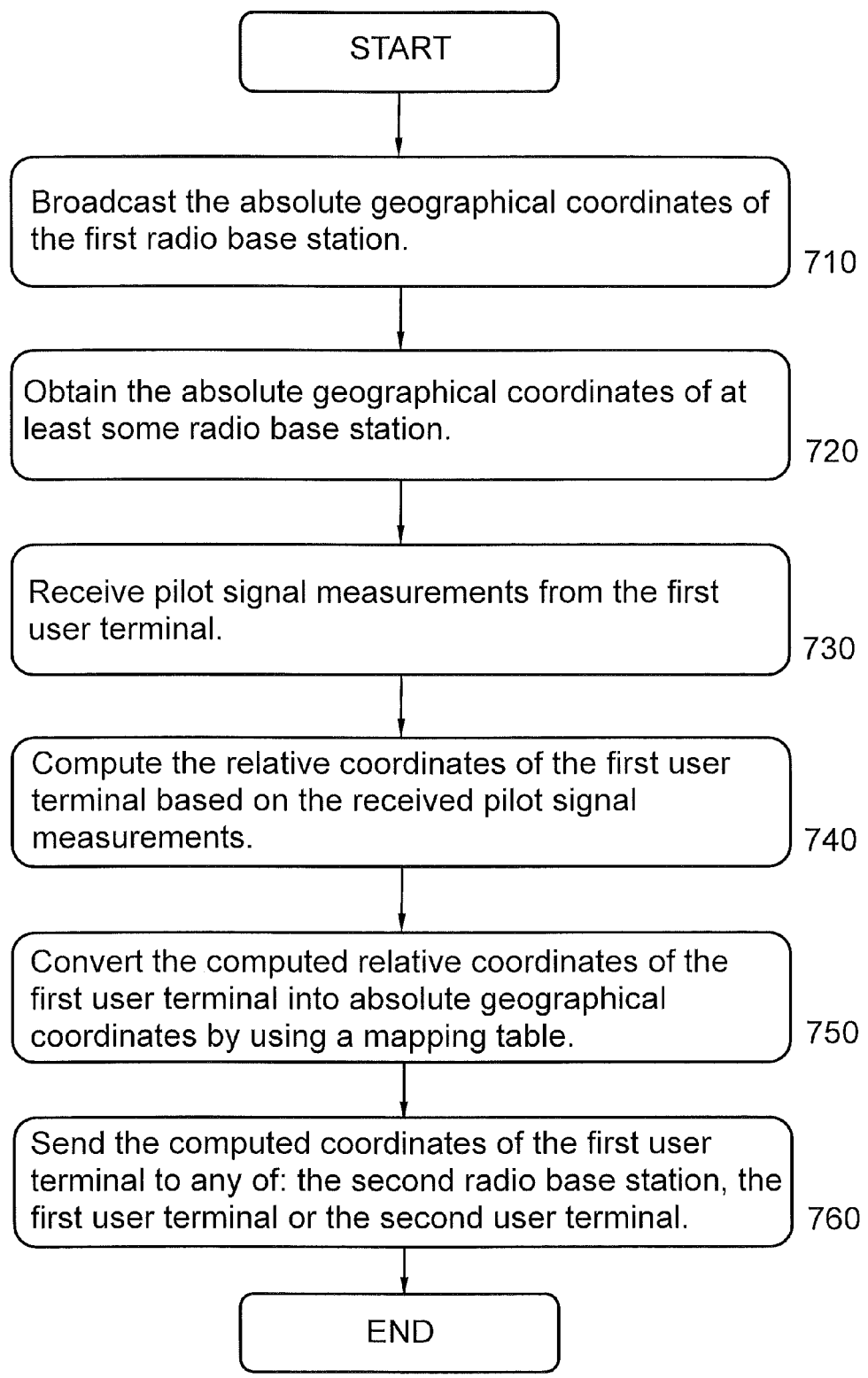
FIG. 7 is a flow chart illustrating embodiments of method steps in a first radio base station.

FIG. 7 is a flow chart illustrating embodiments of method steps in a first radio base station 130. The method aims at serving a first user terminal 110 in providing location information associated with the first user terminal 110, to a second user terminal 120. The first radio base station 130, the first user terminal 110 and the second user terminal 120 are comprised within a wireless communication system 100. The wireless communication system 100 further comprises a plurality of radio base stations 130, 140, 150, 160 of which one second radio base station 140 at the moment is serving the second user terminal 120.

To appropriately serve a first user terminal 110 in providing location information associated with the first user terminal 110, to a second user terminal 120, the method may comprise a number of method steps 710-760. However, it is to be noted that some method steps, e.g. method step 710 and 750 are optional and only comprised within some embodiments. Further, it is to be noted that the method steps 710-760 may be performed in any arbitrary chronological order and that some of them, e.g. step 720 and step 730, or even all steps may be performed simultaneously or in an altered, arbitrarily rearranged, decomposed or even completely reversed chronological order. The method comprises the following steps:

Step 710

This method step is optional and may only be performed within some embodiments.

The absolute geographical coordinates of the first radio base station 130 may be broadcasted.

Step 720

The absolute geographical coordinates, corresponding to the location of at least some radio base station 130, 140, 150, 160 are obtained.

According to some optional embodiments, the absolute geographical coordinates of at least some other radio base station 140 are received from the first user terminal 110.

Step 730

A pilot signal measurement is received from the first user terminal 110, which pilot signal measurement has been made on a signal broadcasted from at least some radio base station 130, 140, 150, 160.

The pilot signal measurement may, according to some embodiments, comprise one or more measurement out of: pilot signal strength, pilot signal quality, round trip time of a signal sent between the first user terminal 110 and the radio base station 130, 140, 150, 160, time difference of arrival between pilot signals sent between the serving first radio base station 130 and neighbour radio base stations 130, 140, 150, 160.

Step 740

The relative coordinates of the first user terminal 110 is computed, which relative coordinates comprises cell ID and geometry values, based on the received pilot signal measurements made on a signal broadcasted from each respective radio base station 130, 140, 150, 160.

Step 750

The computed relative coordinates of the first user terminal 110, which relative coordinates comprises cell ID and geometry values are converted into absolute geographical coordinates by using a mapping table.

Step 760

The computed coordinates of the first user terminal 110 are sent to at least one entity out of: first user terminal 110, the second user terminal 120 and/or the second radio base station 140.

According to some optional embodiments, the absolute geographical coordinates of the first user terminal 110 may be sent to any of the entities: first user terminal 110, the second user terminal 120 and/or the second radio base station 140.

Figure 8:
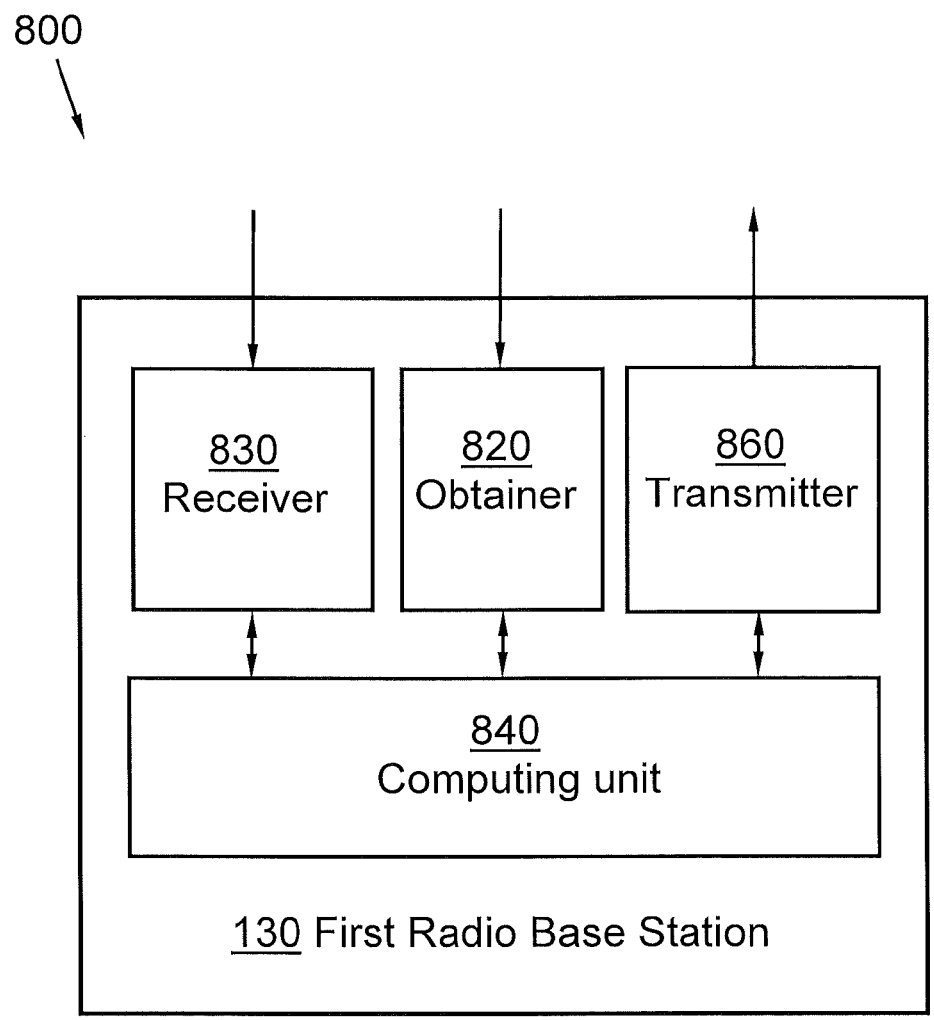
FIG. 8 is a block diagram illustrating embodiments of an arrangement in a first radio base station.

FIG. 8 is a block diagram illustrating embodiments of an arrangement 800 situated in the first radio base station 130. The arrangement 800 is configured to provide location information associated with the first user terminal 110, to a second user terminal 120. The first radio base station 130, the first user terminal 110 and the second user terminal 120 are comprised within a wireless communication system 100. The wireless communication system 100 further comprises a plurality of radio base stations 130, 140, 150, 160. One second radio base station 140, out of this plurality of radio base stations 130, 140, 150, 160 is at the moment serving the second user terminal 120. The arrangement 800 comprises an obtaining unit 820. The obtaining unit 820 is adapted to obtain the absolute geographical coordinates corresponding to the location of at least some radio base station 130, 140, 150, 160. Further, the arrangement 800 comprises a receiving unit 830. The receiving unit 830 is adapted to receive pilot signal measurements from the first user terminal 110. The pilot signal measurements are made on a signal broadcasted from at least some radio base station 130, 140, 150, 160. Also, the arrangement 800 comprises a computing unit 840. The computing unit 840 is adapted to compute the relative coordinates of the first user terminal 110. The relative coordinates comprises cell ID and geometry values. The computation is based on the received pilot signal measurements made on a signal broadcasted from at least some radio base station 130, 140, 150, 160. Further, the arrangement 800 comprises a sending unit 860. The sending unit 860 is adapted to send the computed coordinates of the first user terminal 110 to at least one entity out of: first user terminal 110, the second user terminal 120 and/or the second radio base station 140. The sending unit 860 may further, according to some embodiments be adapted to also broadcast the absolute geographical coordinates of the first radio base station 130.

The arrangement 800 may also, according to some optional embodiments comprise a converting unit 850. The converting unit may be adapted to convert the computed relative coordinates of the first user terminal 110, which relative coordinates comprises cell ID and geometry values, into absolute geographical coordinates by using a mapping table.

For the sake of clarity, at least some internal electronics of the arrangement 800, not completely necessary for performing the present method has been omitted from FIG. 8.

It is to be noted that the described units 810-850 comprised within the arrangement 800 are to be regarded as separate logical entities but not with necessity separate physical entities. Any, some or all of the units 810-850 may be comprised or co-arranged within the same physical unit. However, in order to facilitate the understanding of the functionality of the arrangement 800, the comprised units 810-850 are illustrated as separate physical units in FIG. 8.

Thus the receiving unit 830 and e.g. the transmitting unit 860 may, according to some embodiments, be comprised within one physical unit, a transceiver, which may comprise a transmitter circuit and a receiver circuit, which respectively transmits outgoing radio frequency signals to the first user terminal 110 and receives incoming radio frequency signals from the first user terminal 110 via an antenna. The antenna may be an embedded antenna, a retractable antenna or any antenna known to those having skill in the art without departing from the scope of the present invention.

According to some optional embodiments, the arrangement 800 may comprise further possible units such as e.g. a transceiver, a processing unit, a memory, an input device, an output device, and a bus.

The optional processing unit may comprise a Central Processing Unit (CPU), a processor, a microprocessor, or processing logic that may interpret and execute instructions. The processing unit may perform all data processing functions for inputting, outputting, and processing of data including data buffering and device control functions, such as call processing control, user interface control, or the like.

The optional memory may provide permanent, semi-permanent, or temporary working storage of data and instructions for use by processing unit in performing device processing functions. The memory may comprise e.g. ROM, RAM, large-capacity storage devices, such as a magnetic and/or optical recording medium and its corresponding drive, and/or other types of memory devices.

The optional input device may comprise mechanisms for entry of data into the radio base station 130. As a non limiting example only, the input device may comprise a key pad. The key pad may permit manual user entry of data into the radio base station 130.

The optional bus may interconnect the various components of the radio base station 130 to permit the components to communicate with one another.

The configuration of components of the radio base station 130 illustrated in FIG. 8 is for illustrative purposes only. Other configurations comprising more, fewer, or a different arrangement of components may be implemented.

Figure 9:
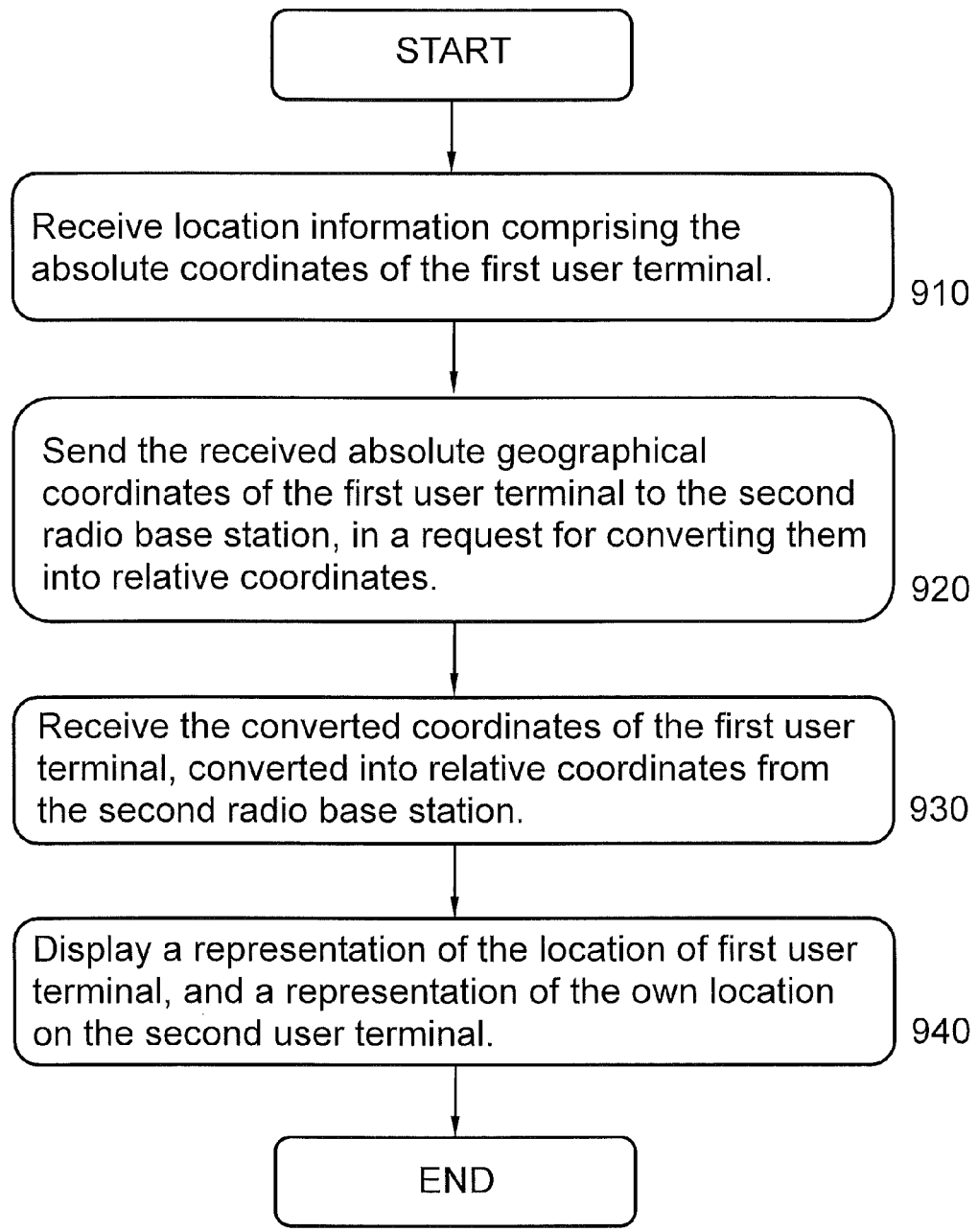
FIG. 9 is a flow chart illustrating embodiments of method steps in a second user terminal.

FIG. 9 is a flow chart illustrating embodiments of method steps in a second user terminal 120. The method aims at receiving location information associated with a first user terminal 110. The first user terminal 110 and the second user terminal 120 are comprised within a wireless communication system 100. The wireless communication system 100 further comprises a plurality of radio base stations 130, 140, 150, 160. One second radio base station 140 out of the plurality of radio base stations 130, 140, 150, 160 is at the moment is serving the second user terminal 120.

To appropriately receiving location information associated with a first user terminal 110, the method may comprise a number of method steps 910-940. However, it is to be noted that some method steps, e.g. method step 940 may be optional and only comprised within some embodiments. The method comprises the following steps:

Step 910

Location information, comprising the absolute geographical coordinates of the first user terminal 110, is received.

Step 920

The received absolute geographical coordinates of the first user terminal 110 are sent to the second radio base station 140, in a request for converting them into relative coordinates comprising a cell ID and geometry values.

Step 930

The coordinates of the first user terminal 110, converted into relative coordinates comprising cell ID and geometry values, are received from the second radio base station 140.

Step 940

This method step is optional and may only be performed within some embodiments.

A representation of the location of first user terminal 110, and a representation of the own location may be displayed on a display 1040 comprised within the second user terminal 120.

Figure 10:
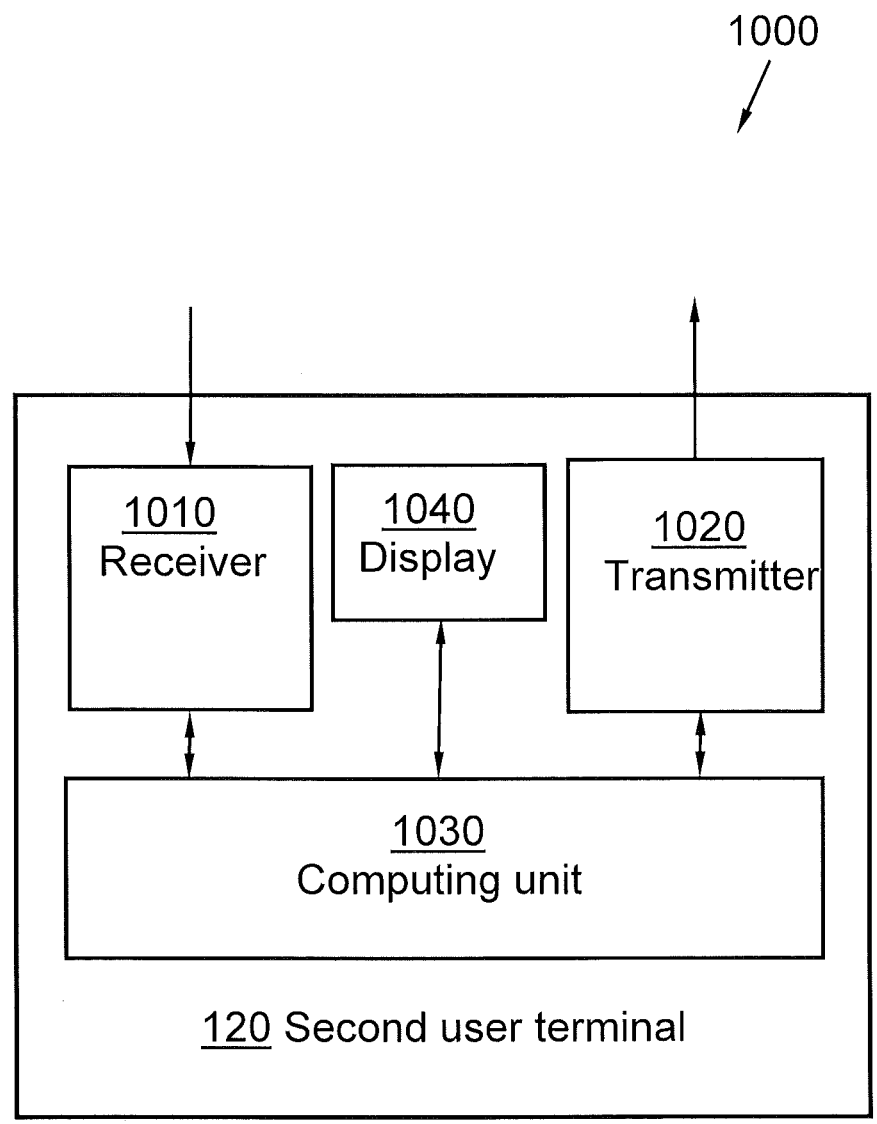
FIG. 10 is a block diagram illustrating embodiments of an arrangement in a second user terminal.

FIG. 10 is a block diagram illustrating embodiments of an arrangement 1000 situated in the second user terminal 120. The arrangement 1000 is configured for receiving location information associated with a first user terminal 110. The first user terminal 110 and the second user terminal 120 are comprised within a wireless communication system 100. The wireless communication system 100 further comprises a plurality of radio base stations 130, 140, 150, 160. One second radio base station 140, out of the plurality of radio base stations 130, 140, 150, 160, is at the moment is serving the second user terminal 120. The arrangement 1000 comprises a receiving unit 1010. The receiving unit 1010 is adapted to receive location information, comprising the absolute geographical coordinates of the first user terminal 110. The receiving unit 1010 is further adapted to receive the coordinates of the first user terminal 110, converted into relative coordinates comprising cell ID and geometry values, from the second radio base station 140.

The arrangement 1000 also comprises a sending unit 1020. The sending unit 1020 is adapted to send the received absolute geographical coordinates of the first user terminal 110 to the second radio base station 140. The sending is made in a request for converting them into relative coordinates comprising a cell ID and geometry values.

The arrangement 1000 may optionally also comprise a display 1040, according to some embodiments. The display 1040 may be adapted to display a representation of the location of first user terminal 110, and a representation of the location of the second user terminal 120.

For the sake of clarity, at least some internal electronics of the arrangement 1000, not completely necessary for performing the present method has been omitted from FIG. 10.

It is to be noted that the described units 1010-1040 comprised within the arrangement 1000 are to be regarded as separate logical entities but not with necessity separate physical entities. Any, some or all of the units 1010-1040 may be comprised or co-arranged within the same physical unit. However, in order to facilitate the understanding of the functionality of the arrangement 1000, the comprised units 1010-1040 are illustrated as separate physical units in FIG. 10.

Thus the receiving unit 1010 and e.g. the transmitting unit 1020 may, according to some embodiments, be comprised within one physical unit, a transceiver, which may comprise a transmitter circuit and a receiver circuit, which respectively transmits outgoing radio frequency signals to the second radio base station 140 and receives incoming radio frequency signals from the second radio base station 140 via an antenna. The antenna may be an embedded antenna, a retractable antenna or any antenna known to those having skill in the art without departing from the scope of the present invention.

According to some optional embodiments, the arrangement 1000 comprises further units such as e.g. a transceiver, a processing unit, a memory, an input device, an output device, and a bus.

The optional processing unit may comprise a Central Processing Unit (CPU), a processor, a microprocessor, or processing logic that may interpret and execute instructions. The processing unit may perform all data processing functions for inputting, outputting, and processing of data including data buffering and device control functions, such as call processing control, user interface control, or the like.

The optional memory may provide permanent, semi-permanent, or temporary working storage of data and instructions for use by processing unit in performing device processing functions. The memory may comprise e.g. ROM, RAM, large-capacity storage devices, such as a magnetic and/or optical recording medium and its corresponding drive, and/or other types of memory devices.

The optional input device may comprise mechanisms for entry of data into the user terminal 120. As a non limiting example only, the input device may comprise a key pad. The key pad may permit manual user entry of data into the user terminal 120.

The optional output device may comprise mechanisms for outputting data in audio, video and/or hard copy format. For example, the output device may comprise a speaker that comprises mechanisms for converting electrical signals into auditory output. The output device may further comprise a display unit that displays output data to the user. For example, the display unit may provide a graphical user interface that displays output data to the user. The display unit may comprise a screen display that may provide a user interface, e.g., a graphical user interface that may be used by a user for selecting device functions. The screen display of the display unit may comprise any type of visual display, such as, for example, a Liquid Crystal Display (LCD), a plasma screen display, a Light-Emitting Diode (LED) display, a Cathode Ray Tube (CRT) display, an Organic Light-Emitting Diode (OLED) display, etc.

The optional bus may interconnect the various components of the user terminal 120 to permit the components to communicate with one another.

The configuration of components of the second user terminal 120 illustrated in FIG. 10 is for illustrative purposes only. Other configurations comprising more, fewer, or a different arrangement of components may be implemented.

Figure 11:
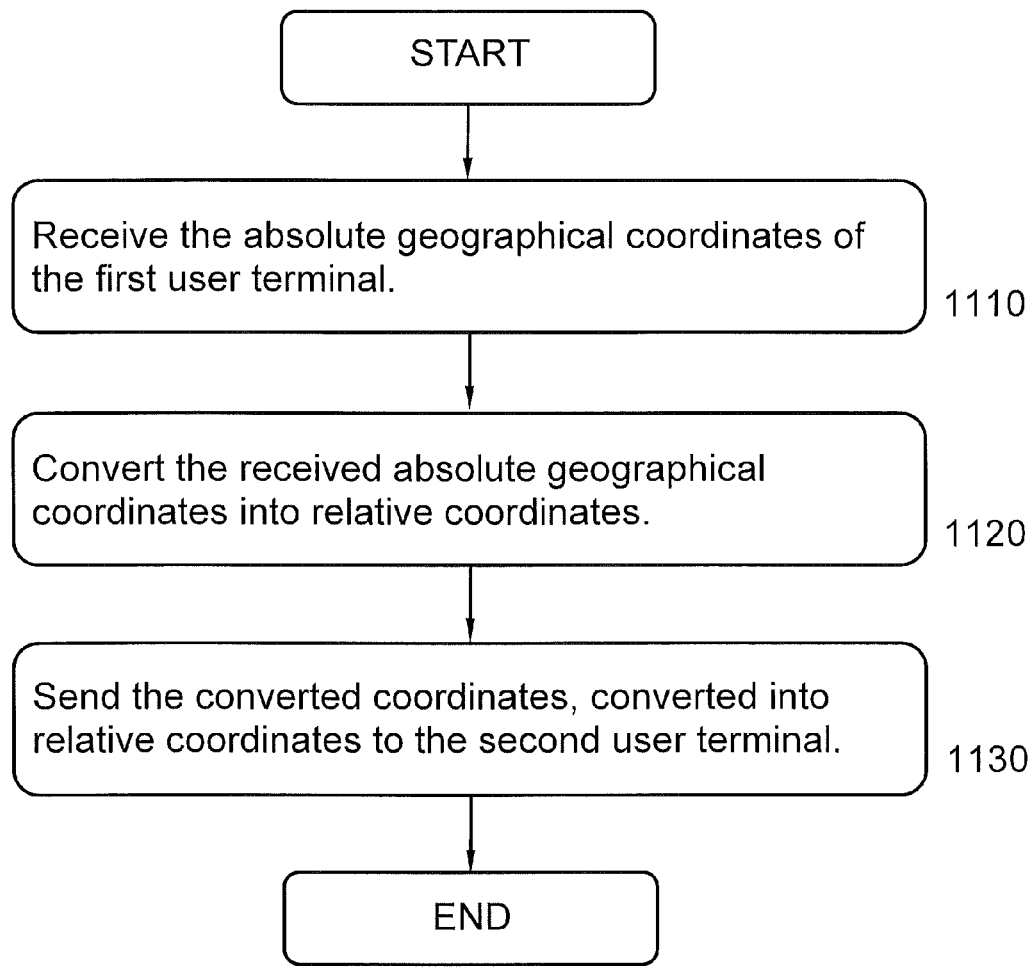
FIG. 11 is a flow chart illustrating embodiments of method steps in a second radio base station.

FIG. 11 is a flow chart illustrating embodiments of method steps in a second radio base station 140. The method aims at serving a second user terminal 120 in receiving location information associated with a first user terminal 110. The second radio base station 140, the first user terminal 110 and the second user terminal 120 are comprised within a wireless communication system 100. The wireless communication system 100 comprises a plurality of radio base stations 130, 140, 150, 160. One first radio base station 130 out of the plurality of radio base stations 130, 140, 150, 160 is at the moment serving the first user terminal 110.

To appropriately serve the second user terminal 120 in receiving location information associated with a first user terminal 110, the method may comprise a number of method steps 1110-1130. However, it is to be noted that parts of some method steps, e.g. method step 1110 and 1120 comprises alternative embodiments. The method comprises the following steps:

Step 1110

The absolute geographical coordinates of the first user terminal 110 are received.

Step 1120

The received absolute geographical coordinates of the first user terminal 110 are converted into relative coordinates by using a mapping table. The relative coordinates comprises cell ID and geometry values.

Step 1130

The converted coordinates of the first user terminal 110, converted into relative coordinates comprising cell ID and geometry values, are sent to the second user terminal 120.

Figure 12:
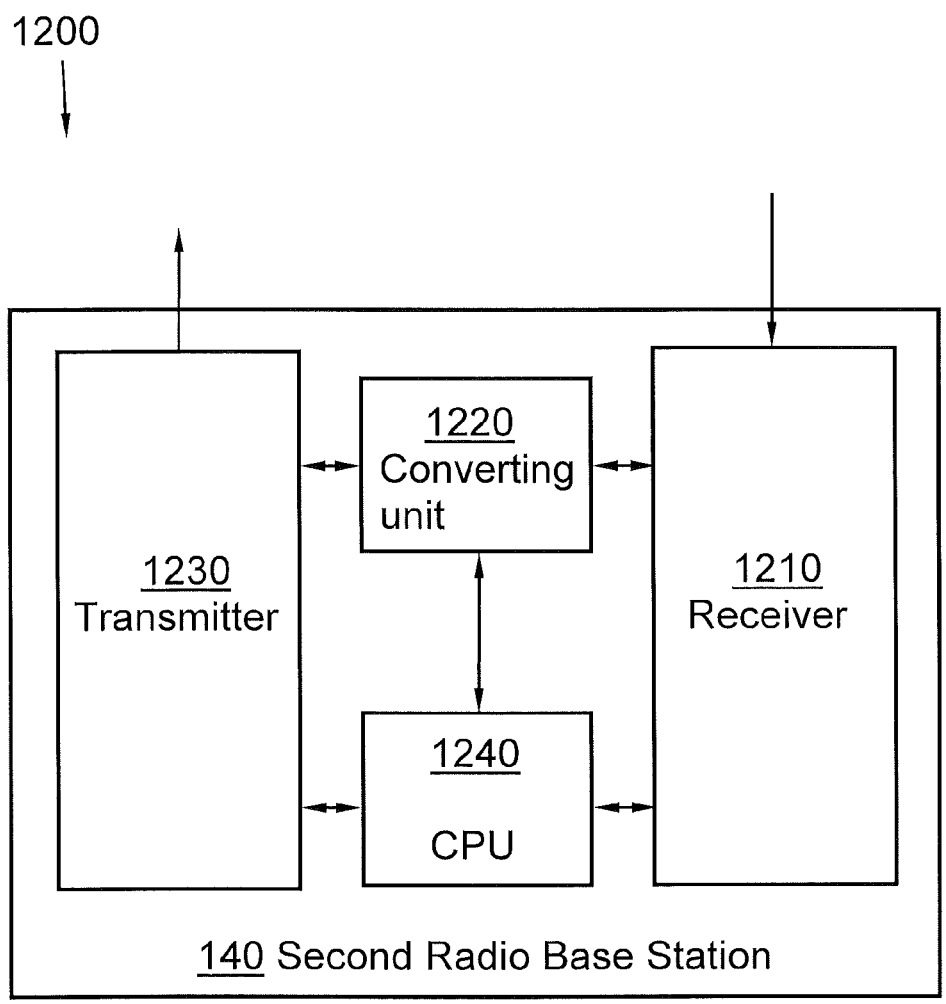
FIG. 12 is a block diagram illustrating embodiments of an arrangement in a second radio base station.

FIG. 12 is a block diagram illustrating embodiments of an arrangement 1200 situated in a second radio base station 140. The arrangement 1200 is configured for serving a second user terminal 120 in receiving location information associated with a first user terminal 110. The second radio base station 140, the first user terminal 110 and the second user terminal 120 are comprised within a wireless communication system 100. The wireless communication system 100 comprises a plurality of radio base stations 130, 140, 150, 160. One first radio base station 130 out of the plurality of radio base stations 130, 140, 150, 160 is at the moment serving the first user terminal 110. The arrangement 1200 comprises a receiving unit 1210. The receiving unit 1210 is adapted to receive the absolute geographical coordinates of the first user terminal 110. The arrangement 1200 also comprises a converting unit 1220. The converting unit 1220 is adapted to convert the received absolute geographical coordinates into relative coordinates comprising cell ID and geometry values by using a mapping table. The arrangement 1200 further comprises a sending unit 1230. The sending unit 1230 is adapted to send the converted coordinates of the first user terminal 110, which have been converted into relative coordinates comprising cell ID and geometry values, to the second user terminal 120.

For the sake of clarity, at least some internal electronics of the arrangement 1200, not completely necessary for performing the present method has been omitted from FIG. 12.

According to some optional embodiments, the arrangement 1200 may comprise further optional units such as e.g. a transceiver, a processing unit, a memory, an input device, an output device, and a bus.

The optional processing unit 1240 may comprise a Central Processing Unit (CPU), a processor, a microprocessor, or processing logic that may interpret and execute instructions. The processing unit may perform all data processing functions for inputting, outputting, and processing of data including data buffering and device control functions, such as call processing control, user interface control, or the like.

The optional memory may provide permanent, semi-permanent, or temporary working storage of data and instructions for use by processing unit in performing device processing functions. The memory may comprise e.g. ROM, RAM, large-capacity storage devices, such as a magnetic and/or optical recording medium and its corresponding drive, and/or other types of memory devices.

The optional input device may comprise mechanisms for entry of data into the radio base station 140. As a non limiting example only, the input device may comprise a key pad. The key pad may permit manual user entry of data into the radio base station 140.

The optional bus may interconnect the various components of the radio base station 140 to permit the components 1210-1240 to communicate with one another.

It is to be noted that the described units 1210-1240 comprised within the arrangement 1200 are to be regarded as separate logical entities but not with necessity separate physical entities. Any, some or all of the units 1210-1240 may be comprised or co-arranged within the same physical unit. However, in order to facilitate the understanding of the functionality of the arrangement 1200, the comprised units 1210-1240 are illustrated as separate physical units in FIG. 12.

Thus the receiving unit 1210 and e.g. the transmitting unit 1230 may, according to some embodiments, be comprised within one physical unit, a transceiver, which may comprise a transmitter circuit and a receiver circuit, which respectively transmits outgoing radio frequency signals to the second user terminal 120 and receives incoming radio frequency signals from the second user terminal 120 via an antenna. The antenna may be an embedded antenna, a retractable antenna or any antenna known to those having skill in the art without departing from the scope of the present invention.

The configuration of components of the radio base station 140 illustrated in FIG. 12 is for illustrative purposes only. Other configurations comprising more, fewer, or a different arrangement of components may be implemented.

Some Particular Embodiments

The method in the first user terminal 110, the method in the second user terminal 120, the method in the first radio base station 130, the method in the second radio base station 140 may be implemented through one or more processors 620, 840, 1030, 1240 in the first user terminal 110, the second user terminal 120, the first radio base station 130 and/or the second radio base station 140 respectively, together with computer program code for performing the functions of the present methods. The computer program code mentioned above may also be provided as a computer program product, for instance in the form of a data carrier carrying computer program code for performing the method according to the present invention when being loaded e.g. into the processor units 620, 840, 1030, 1240. The data carrier may be e.g. a CD ROM disc, a memory stick, or any other appropriate medium such as a disk or tape that can hold machine readable data. The computer program code can furthermore be provided as pure program code on a server and downloaded to the first user terminal 110, the second user terminal 120, the first radio base station 130 and/or the second radio base station 140 remotely.

Thus a computer program comprising instruction sets for performing the method according to at least some of the method steps 510-540 may be used for implementing the previously described method in the first user terminal 110.

Further, a computer program comprising instruction sets for performing the method according to at least some of the method steps 710-760 may be used for implementing the previously described method in the first radio base station 130.

Also, a computer program comprising instruction sets for performing the method according to at least some of the method steps 910-942 may be used for implementing the previously described method in the second user terminal 120.

In addition, a computer program comprising instruction sets for performing the method according to at least some of the method steps 1110-1130 may be used for implementing the previously described method in the second radio base station 140.

As will be appreciated by one of skill in the art, the present invention may be embodied as a method and an arrangement in a first user terminal 110, a method and an arrangement in a first radio base station 130, a method and an arrangement in a second user terminal 120, a method and an arrangement in a second radio base station 140, or computer program products. Accordingly, the present invention may take the form of an entirely hardware embodiment, a software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in any arbitrary object oriented programming language such as Java®, Smalltalk or C++. However, the computer program code for carrying out the steps of the present methods may also be written in any conventional procedural programming languages, such as the "C" programming language and/or a lower level assembler language. The program code may execute entirely on any, some or all of the arrangements 600, 800, 1000, 1200, partly on the arrangements 600, 800, 1000, 1200, as a stand-alone software package, partly on the arrangements 600, 800, 1000, 1200, and partly on a remote computing device or entirely on the remote computing device. In the latter scenario, the remote computing device may be connected to at least some of the arrangements 600, 800, 1000, 1200 through a local area network (LAN) or a wide area network (WAN), or the connection may be made to an external computer, for example, through the Internet using e.g. an Internet Service Provider.

Furthermore, the present methods are described in part above with reference to flowchart illustrations in FIG. 5, FIG. 7, FIG. 9 and FIG. 11 and/or block diagrams of arrangements illustrated in FIG. 6, FIG. 8, FIG. 10 and FIG. 12, and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks in FIG. 5, FIG. 7, FIG. 9 and FIG. 11.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The terminology used in the detailed description of the particular exemplary embodiments illustrated in the accompanying drawings is not intended to be limiting of the invention.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

The invention claimed is:

1. A method of operating a first user terminal for providing location information associated with the first user terminal to a second user terminal, the first user terminal and the second user terminal are comprised within a wireless communication system, the wireless communication system further comprising a plurality of radio base stations of which a first one of the plurality of radio base stations is serving the first user terminal, the method comprising:
receiving a signal from one of the plurality of radio base stations, comprising absolute geographical coordinates corresponding to the location of the one of the plurality of radio base stations;
performing pilot signal measurements on the received signal;
determining absolute geographical coordinates corresponding to the location of the first user terminal, based on the performed pilot signal measurements and the received absolute geographical coordinates of the one of the plurality of radio base stations; and
transmitting the determined absolute geographical coordinates to the second user terminal.

2. A method according to claim 1, wherein the received signal from the one of the plurality of radio base stations comprising the absolute geographical coordinates corresponding to the location of the one of the plurality of radio base stations further comprises the absolute geographical coordinates corresponding to the location of another one of the plurality of radio base stations.

3. A method according to claim 1, wherein determining the absolute geographical coordinates corresponding to the location of the first user terminal comprises determining relative coordinates of the first user terminal, the relative coordinates comprising cell ID and geometry values; and converting the determined relative coordinates of the first user terminal into absolute geographical coordinates of the first user terminal by using a mapping table.

4. A method according to claim 1, wherein determining the absolute geographical coordinates corresponding to the location of the first user terminal further comprises:

reporting the pilot signal measurements and/or received absolute geographical coordinates of at least some of the plurality of radio base stations, to the first one of the plurality of radio base stations, and receiving the absolute geographical coordinates of the first user terminal from the first one of the plurality of radio base stations, where the absolute geographical coordinates of the first user terminal have been computed based on the reported pilot signal measurements and the absolute geographical coordinates of at least some of the plurality of radio base stations.

5. A method according claim 1, wherein determining the absolute geographical coordinates corresponding to the location of the first user terminal further comprises:

reporting the pilot signal measurements and/or received absolute geographical coordinates of at least some of the plurality of radio base stations, to the first one of the plurality of radio base stations, and receiving relative coordinates of the first user terminal, the relative coordinates comprising cell ID and geometry values, from the first one of the plurality of radio base stations, where the relative coordinates have been computed based on the reported pilot signal measurements, and converting the received relative coordinates of the first user terminal into absolute geographical coordinates of the first user terminal by using a mapping table.

6. A method according to claim 1, wherein performing the pilot signal measurements comprises measuring one or of: pilot signal strength, pilot signal quality, round trip time of a signal sent between the first user terminal and to any one of the plurality of radio base stations, time difference of arrival between pilot signals sent between the serving first one of the plurality of radio base stations and other ones of the plurality of radio base stations.

7. A method according to claim 1, wherein the absolute geographical coordinates are Global Navigational Satellite System "GNSS" based.

8. A method according to claim 3 any, wherein the relative coordinates are Global Navigational Satellite System "GNSS" based.

9. A method according to claim 7 wherein the Global Navigational Satellite System "GNSS" is based on a Global Positioning System "GPS".

10. A first user terminal comprising a system for providing location information associated with the first user terminal to a second user terminal, the first user terminal and the second user terminal are comprised within a wireless communication system, the wireless communication system further comprising a plurality of radio base stations of which a first one of the plurality of radio base stations is serving the first user terminal, the system comprising:

a receiving unit configured to receive a signal from one of the plurality of radio base stations, comprising absolute geographical coordinates corresponding to the location of the one of the plurality of radio base stations;

a measurement unit configured to perform pilot signal measurements on the received signal;

a determination unit configured to determine the absolute geographical coordinates corresponding to the location of the first user terminal, based on the performed pilot signal measurements and the received absolute geographical coordinates of the one of the plurality of radio base stations; and a transmitting unit configured to transmit the determined absolute geographical coordinates to the second user terminal.

11. A method of operating a first one of a plurality of radio base stations for providing location information associated with a first user terminal, to a second user terminal, the first user terminal and the second user terminal are comprised within a wireless communication system, the wireless communication network further comprising the plurality of radio base stations of which a second one of the plurality of radio base stations is serving the second user terminal, the method comprising:

obtaining absolute geographical coordinates corresponding to a location of at least one of the plurality of radio base stations;

receiving pilot signal measurements from the first user terminal, the pilot signal measurements being made on a signal broadcasted from at least one of the plurality of radio base stations;

computing relative coordinates of the first user terminal, the relative coordinates comprising cell ID and geometry values based on the received pilot signal measurements made on a signal broadcasted from each respective one of the plurality of radio base stations;

sending the computed relative coordinates of the first user terminal to at least one of the first user terminal, the second user terminal and/or the second one of the plurality of radio base stations.

12. A method according to claim 11, further comprising: broadcasting the absolute geographical coordinates of a first one of the plurality of radio base stations.

13. A method according to claim 11, further comprising: converting the computed relative coordinates of the first user terminal, the computed relative coordinates of the first user terminal comprising the cell ID and the geometry values, into absolute geographical coordinates of the first user terminal by using a mapping table, and wherein sending the computed relative coordinates of the first user terminal comprises sending the absolute geographical coordinates of the first user terminal.

14. A method according to claim 11, wherein obtaining the absolute geographical coordinates of at least one of the plurality of radio base stations comprises:

receiving the absolute geographical coordinates of at least another one of the plurality of radio base stations from the first user terminal.

15. A first radio base station comprising a system for serving a first user terminal in providing location information associated with a first user terminal, to a second user terminal, the first user terminal and the second user terminal are comprised within a wireless communication system, the wireless communication network further comprising the plurality of radio base stations, of which a second one of the plurality of radio base stations is serving the second user terminal, the system comprising arrangement:

an obtaining unit configured to obtain absolute geographical coordinates corresponding to a location of at least one of the plurality of radio base stations;

a receiving unit configured to receive pilot signal measurements from the first user terminal, the pilot signal measurements being made on a signal broadcasted from at least one of the plurality of radio base stations;

a computing unit configured to compute relative coordinates of the first user terminal, the relative coordinates comprising cell ID and geometry values based on the received pilot signal measurements made on a signal broadcasted from each respective one of the plurality of radio base stations; and a sending unit configured to send the computed relative coordinates of the first user terminal to at least one of the first user terminal, the second user terminal and/or the second one of the plurality of radio base stations.

16. A method of operating a second user terminal, for receiving location information associated with a first user terminal, the first user terminal and the second user terminal are comprised within a wireless communication system, the wireless communication system further comprising a plurality of radio base stations of which a second one of the plurality of radio base stations is serving the second user terminal, the method comprising:

receiving location information comprising absolute geographical coordinates of the first user terminal;

sending the received absolute geographical coordinates of the first user terminal to the second one of the plurality of radio base stations, in a request for converting the received absolute geographical coordinates of the first user terminal into relative coordinates comprising a cell ID and geometry values; and receiving the relative coordinates of the first user terminal comprising cell ID and geometry values from the second radio base station.

17. A method according to claim 16, further comprising:
displaying a representation of a location of first user terminal, and a representation of a location of the second user terminal on a display of the second user terminal.

18. A second user terminal, comprising a system for receiving location information associated with a first user terminal, the first user terminal and the second user terminal are comprised within a wireless communication system, the wireless communication system further comprising a plurality of radio base stations of which a second one of the plurality of radio base stations is serving the second user terminal, the system comprising:

a receiving unit configured to receive location information comprising absolute geographical coordinates of the first user terminal;

a sending unit configured to send the received absolute geographical coordinates of the first user terminal to the second one of the plurality of radio base stations, in a request for converting the received absolute geographical coordinates of the first user terminal into relative coordinates comprising a cell ID and geometry values; and wherein the receiving unit is further configured to receive the relative coordinates of the first user terminal comprising cell ID and geometry values from the second radio base station.

19. A method of operating a second one of a plurality of radio base stations, for serving a second user terminal in receiving location information associated with a first user terminal, the first user terminal and the second user terminal are comprised within a wireless communication system, the wireless communication system further comprises the plurality of radio base stations of which a first one of the plurality of radio base stations is serving the first user terminal, the method comprising:

receiving absolute geographical coordinates of the first user terminal;

converting the received absolute geographical coordinates of the first user terminal into relative coordinates of the first user terminal comprising cell ID and geometry values by using a mapping table; and sending the relative coordinates of the first user terminal comprising the cell ID and the geometry values to the second user terminal.

20. A second radio base station comprising a system for serving a second user terminal in receiving location information associated with a first user terminal, the first user terminal and the second user terminal are comprised within a wireless communication system, the wireless communication system further comprises the plurality of radio base stations of which a first one of the plurality of radio base stations is serving the first user terminal, the system comprising:

a receiving unit configured to receive absolute geographical coordinates of the first user terminal;

a converting unit configured to convert the received absolute geographical coordinates of the first user terminal into relative coordinates of the first user terminal comprising cell ID and geometry values by using a mapping table; and a sending unit configured to send the relative coordinates of the first user terminal comprising the cell ID and the geometry values to the second user terminal.

* * * * *

UNITED STATES PATENT AND TRADEMARK OFFICE
CERTIFICATE OF CORRECTION

| | | |
|---|---|---|
| PATENT NO. | : 8,718,634 B2 | Page 1 of 1 |
| APPLICATION NO. | : 13/128231 | |
| DATED | : May 6, 2014 | |
| INVENTOR(S) | : Fodor et al. | |

It is certified that error appears in the above-identified patent and that said Letters Patent is hereby corrected as shown below:

In the Specification

In Column 10, Line 36, delete "(RU)" and insert -- (RTT) --, therefor.

In Column 12, Line 8, delete "first" and insert -- The first --, therefor.

In the Claims

In Column 25, Line 48, in Claim 8, delete "claim 3 any," and insert -- claim 3, --, therefor.

Signed and Sealed this
Seventh Day of July, 2015

Michelle K. Lee
*Director of the United States Patent and Trademark Office*